US012578469B1

(12) United States Patent   (10) Patent No.:   US 12,578,469 B1

Costea et al.   (45) Date of Patent:   Mar. 17, 2026

(54) DYNAMIC OBJECT AUTO-LABELING

(71) Applicant: Zoox, Inc., Foster City, CA (US)

(72) Inventors: Arthur Daniel Costea, Foster City, CA (US); David Pfeiffer, Foster City, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 931 days.

(21) Appl. No.: 17/854,738

(22) Filed: Jun. 30, 2022

(51) Int. Cl.
| | |
|---|---|
| *G01S 17/42* | (2006.01) |
| *G01S 7/48* | (2006.01) |
| *G01S 17/894* | (2020.01) |
| *G01S 17/931* | (2020.01) |
| *G06N 20/00* | (2019.01) |

(52) U.S. Cl.
CPC ............ *G01S 17/42* (2013.01); *G01S 7/4808* (2013.01); *G01S 17/894* (2020.01); *G01S 17/931* (2020.01); *G06N 20/00* (2019.01)

(58) Field of Classification Search
CPC ......... G06N 20/00; G01S 17/42; G01S 17/06; G01S 17/931; G01S 17/93; G01S 17/894; G01S 17/89; G01S 7/4808; G01S 7/48
USPC .......................................................... 706/12
See application file for complete search history.

(56) References Cited

U.S. PATENT DOCUMENTS

| | | | | |
|---|---|---|---|---|
| 10,921,817 | B1 * | 2/2021 | Kangaspunta | G06V 20/56 |
| 11,126,180 | B1 * | 9/2021 | Kobilarov | B60W 30/18163 |
| 2019/0258878 | A1 * | 8/2019 | Koivisto | G05D 1/00 |
| 2019/0383941 | A1 * | 12/2019 | Siddiqui | G01S 17/89 |
| 2020/0278681 | A1 * | 9/2020 | Gier | G05D 1/0246 |
| 2021/0090274 | A1 * | 3/2021 | Fu | A01G 25/09 |
| 2021/0094539 | A1 * | 4/2021 | Beller | G05D 1/0214 |
| 2021/0129834 | A1 * | 5/2021 | Gier | B60W 30/0956 |
| 2021/0181758 | A1 * | 6/2021 | Das | G06F 18/25 |
| 2021/0201055 | A1 * | 7/2021 | Chaudhuri | G05D 1/0214 |
| 2021/0302583 | A1 * | 9/2021 | Agrawal | G01S 7/497 |
| 2022/0185267 | A1 * | 6/2022 | Beller | B60W 30/0956 |

FOREIGN PATENT DOCUMENTS

| | | | | |
|---|---|---|---|---|
| WO | WO-2008088409 A2 * | 7/2008 | | G06V 20/52 |

OTHER PUBLICATIONS

Galceran et al., "Augmented vehicle tracking under occlusions for decision-making in autonomous driving", 2015 IEEE/RSJ International Conference on Intelligent Robots and Systems (IROS), Sep. 28-Oct. 2, 2015, pp. 3559-3565. (Year: 2015).*

(Continued)

*Primary Examiner* — Hwei-Min Lu

(74) *Attorney, Agent, or Firm* — Lee & Hayes, P.C.

(57) ABSTRACT

Techniques for determining labels for potentially small, moving, and non-impeding objects in an environment are disclosed. Unlabeled lidar segments may be evaluated to determine whether segments are associated with objects located in a drivable region and to determine one or more characteristics of such segments. This determination includes comparing segment characteristics to various criteria that may be associated with small, dynamic, objects, such as object size, motion, occlusion, and/or solidity. Based on this evaluation and whether the segment is in a drivable region, the system determines whether to label the segment as a small, dynamic, non-impeding object.

20 Claims, 5 Drawing Sheets

(56) References Cited

OTHER PUBLICATIONS

Razlaw et al., "Detection and Tracking of Small Objects in Sparse
3D Laser Range Data", 2019 International Conference on Robotics
and Automation (ICRA), May 20-24, 2019, pp. 2967-2973. (Year:
2019).*
Chen et al., "Automatic Labeling to Generate Training Data for
Online LiDAR-based Moving Object Segmentation", ARXIV ID:
2201.04501, pub. date: Jan. 12, 2022, pp. 1-8. (Year: 2022).*

* cited by examiner

100

200 ⤸

300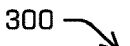

LIDAR PERCEPTION SYSTEM 304

LIDAR SENSOR DATA 302

TOP-DOWN SEGMENTATION 306

CONVOLUTIONAL NEURAL NETWORK 308

LIDAR SEGMENT CLASSIFIER 310

SEGMENT CLASSIFIER(S) 312

CONSISTENCY COMPONENT(S) 314

IMPEDING AND OTHER POINT/SEGMENT DATA 316

SMALL, DYNAMIC, NON-IMPEDING POINT/SEGMENT DATA 318

SENSOR FUSION AND TRACKING SYSTEM 320

SMALL, DYNAMIC, NON-IMPEDING POINT/SEGMENT TRACKING SYSTEM 322

SMALL, DYNAMIC, NON-IMPEDING OBJECT TRACK 324

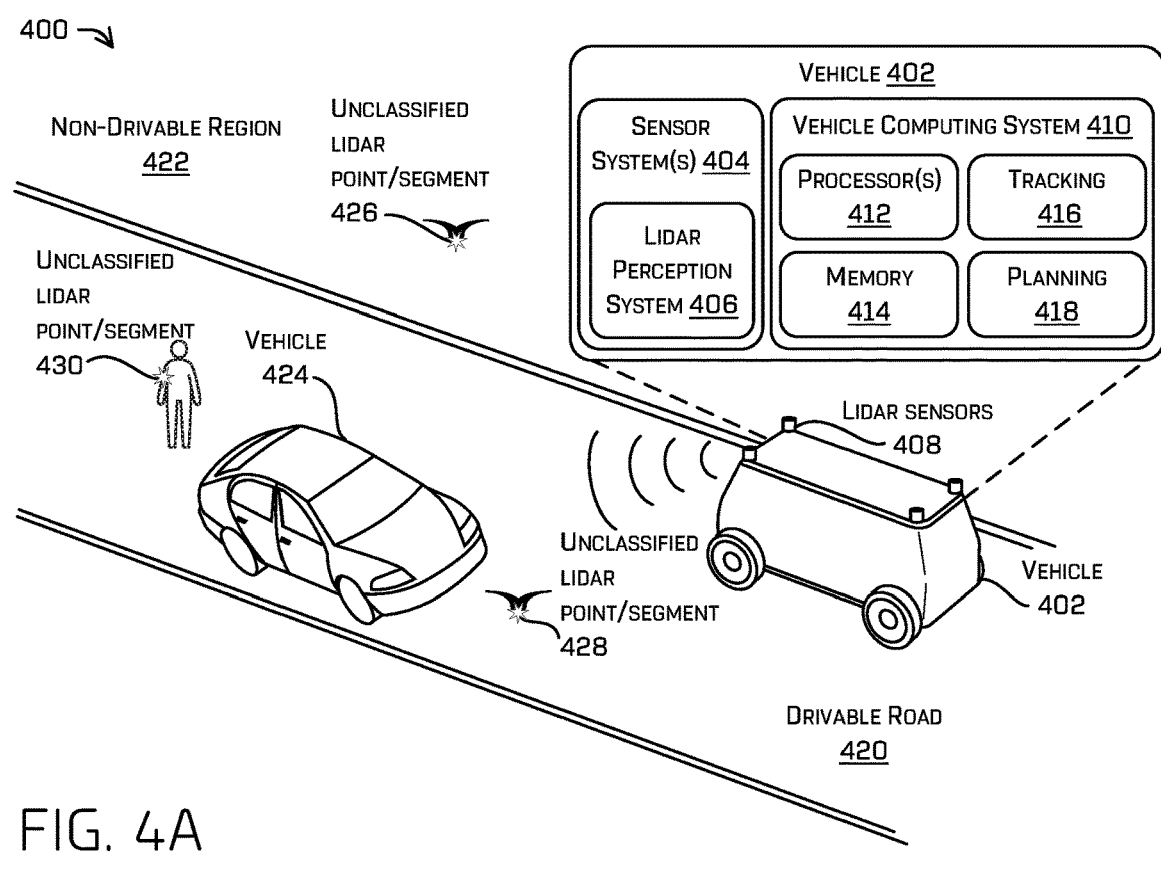

NON-DRIVABLE REGION 422

UNCLASSIFIED LIDAR POINT/SEGMENT 426

UNCLASSIFIED LIDAR POINT/SEGMENT 430

VEHICLE 424

VEHICLE 402

SENSOR SYSTEM(S) 404

LIDAR PERCEPTION SYSTEM 406

VEHICLE COMPUTING SYSTEM 410

PROCESSOR(S) 412

TRACKING 416

MEMORY 414

PLANNING 418

LIDAR SENSORS 408

UNCLASSIFIED LIDAR POINT/SEGMENT 428

VEHICLE 402

DRIVABLE ROAD 420

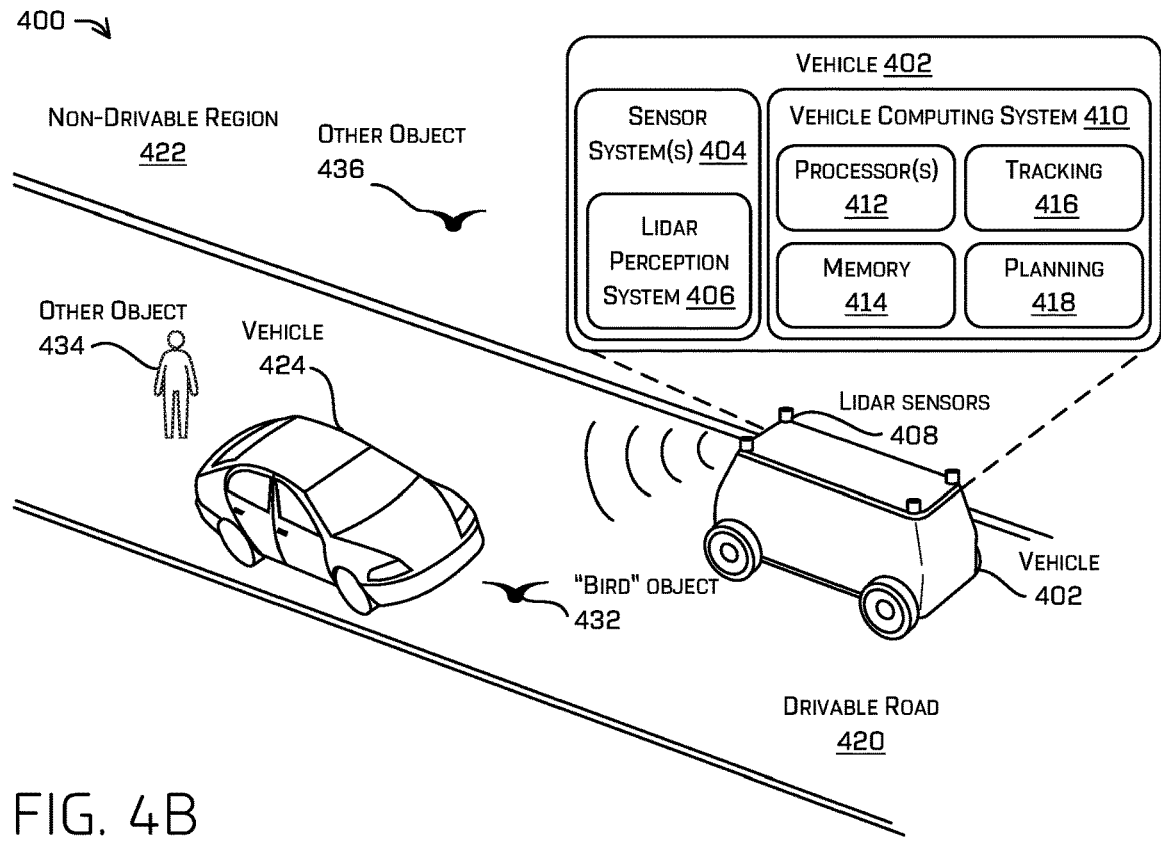

NON-DRIVABLE REGION 422

OTHER OBJECT 436

OTHER OBJECT 434

VEHICLE 424

VEHICLE 402

SENSOR SYSTEM(S) 404

LIDAR PERCEPTION SYSTEM 406

VEHICLE COMPUTING SYSTEM 410

PROCESSOR(S) 412

TRACKING 416

MEMORY 414

PLANNING 418

LIDAR SENSORS 408

"BIRD" OBJECT 432

VEHICLE 402

DRIVABLE ROAD 420

FIG. 4B

DYNAMIC OBJECT AUTO-LABELING

BACKGROUND

Various systems and techniques are utilized to perform detection of objects, such as vehicles, pedestrians, and bicycles, in an environment. For example, autonomous vehicles may be configured with lidar systems that use lasers to emit pulses into an environment and sensors to detect pulses that are reflected back from surfaces of objects in the environment. Various properties of the reflected pulses can be measured to generate data representing the presence and various characteristics of objects in the environment. In many environments, there may be solid objects that reflect such pulses but do not impede the travel of a vehicle because they are too small to have a substantial effect on the vehicle or the object if encountered. Such small objects may also be likely to move out of the path of travel before the vehicle encounters such objects. For example, birds, bats, large insects, other small flying animals, and other small flying objects (e.g., wind-blown paper, plastic bags) may reflect laser pulses but may not affect vehicle travel. Pulses reflected off such small, dynamic, non-impeding objects may produce a false positive indication of the existence of an impeding surface at the location of the object, even though the object at that location may not impede the movement of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a block diagram of an example lidar perception system and an example small, dynamic, and non-impeding object tracking system, in accordance with examples of the disclosure.

FIG. 4A is a diagram of an example environment in which a vehicle may encounter candidate small, dynamic, and/or non-impeding objects as represented by unlabeled lidar segment data, in accordance with examples of the disclosure.

FIG. 4B is a diagram of the example environment of FIG. 4A in which the vehicle may determine a classification for candidate small, dynamic, and/or non-impeding objects based on associated unlabeled lidar segment data, in accordance with examples of the disclosure.

DETAILED DESCRIPTION

Figure 1:
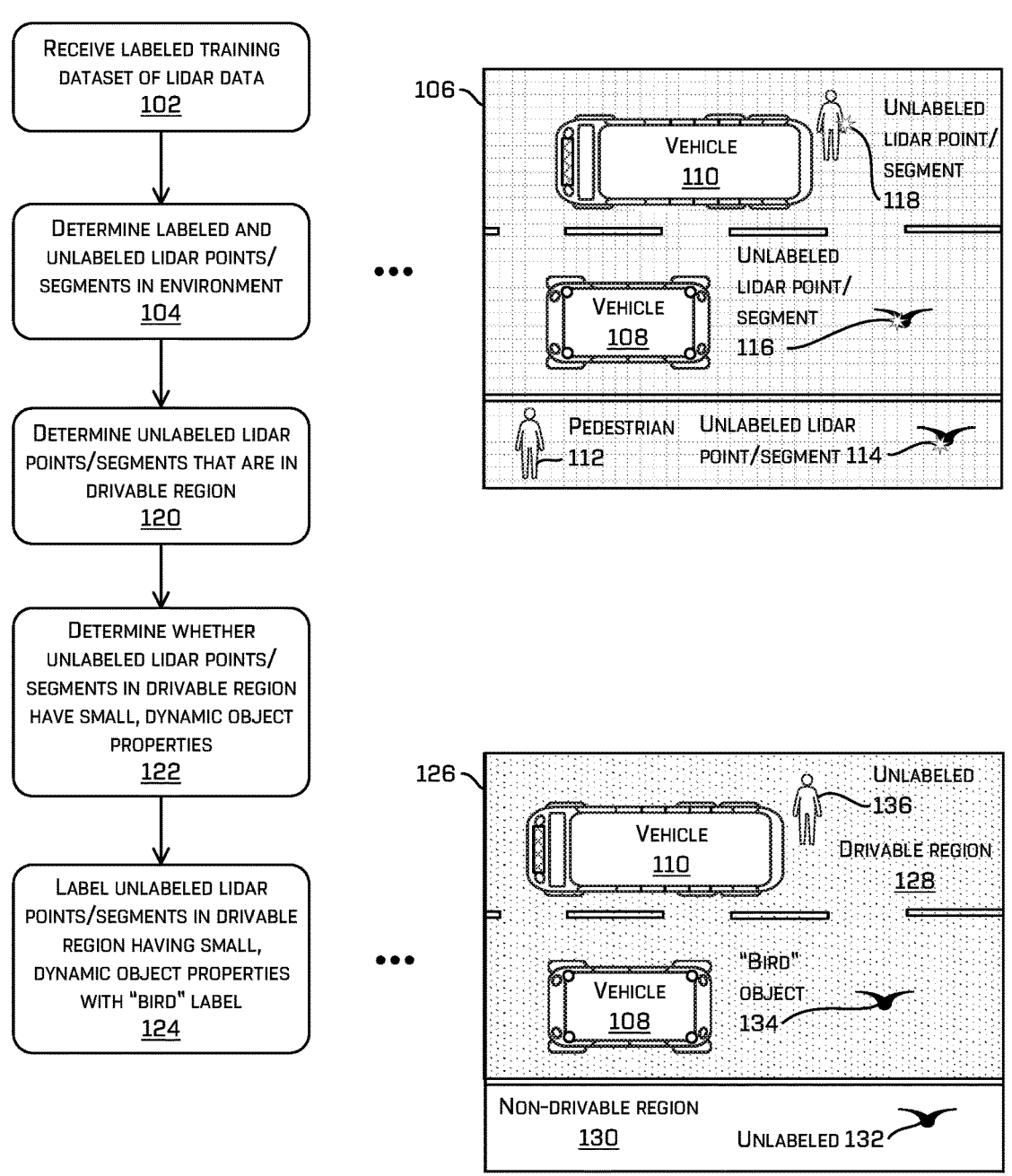
FIG. 1 is a pictorial flow diagram of an example process for determining an object classification for unlabeled lidar segments, in accordance with examples of the disclosure.

Techniques for improving dynamic, non-impeding object detection and for training models to identify and classify dynamic, non-impeding objects and associated detections discussed herein may include training a model to label lidar points and/or segments based on one or more criteria associated with such points/segments. In various examples, unlabeled lidar points and/or segments may be labeled based on meeting criteria associated with small, dynamic, non-impeding objects. The model may then be used, for example in conjunction with other perception and/or classification systems and/or components, to detect and label small, dynamic, non-impeding objects in a real-world environment at a vehicle that may be traveling through the environment.

Non-impeding objects may be objects in an environment that generally should not impede motion of an autonomous vehicle in the environment, such as small moving objects (e.g., birds, leaves, bats, wind-blown debris), objects composed of fine particulate matter or gases (e.g., dust, fog, steam, smoke), and other objects that are immaterial to vehicle progress (e.g., plastic bags, paper debris, tumbleweed, leaves, etc.). A non-impeding object may inadvertently be detected by a perception system to be an impeding object that should impede movement of a vehicle and be avoided. A small, dynamic, non-impeding object may be a (e.g., rapidly) moving object that is too small to have a substantial effect on a vehicle if encountered and/or is likely to move out of the path of travel before encountering the vehicle. For example, a small, dynamic, non-impeding object like a bird will typically fly out of the path of a vehicle before colliding with the vehicle. In another example, a small, dynamic, non-impeding object like a plastic bag blowing in the breeze will typically be blown out of the path of a vehicle (e.g., by wind and/or by a draft generated by the vehicle) before colliding with the vehicle. Moreover, such an object is unlikely to affect the vehicle even if encountered by the vehicle. Other examples of small, dynamic, non-impeding objects include piece of light debris (e.g., paper, leaves) blowing in the wind, bats, large insects, other small flying animals, and other small, light, moving objects.

A small, dynamic, non-impeding object may be an object (e.g., a solid object) having one or more surfaces capable of reflecting lidar pulses and/or other one or more other types of emissions. According to the techniques described herein, objects may be detected by a sensor system and determined to be objects of particular types by a vehicle computing system (e.g., by a machine-learned model executed by the vehicle computing system using sensor data). When the vehicle computing system determines than an object is a non-impeding object (e.g., a small, dynamic, non-impeding object), the vehicle computing system (e.g., a planning component of the vehicle computing system) may plan a trajectory that disregards that object because a non-impeding object will not impede the travel of a vehicle through an environment. However, an accurate labeling of a larger solid or otherwise vehicle-impeding object as a non-impeding object may result in a hazardous vehicle trajectory. The techniques described herein may improve the accuracy of impeding and non-impeding object determinations and labeling, the accuracy of labeling sensor data points and/or segments associated with such objects, and in particular the accuracy of labeling small, dynamic, non-impeding objects, by one or more machine-learned models trained and/or executed according to the disclosed examples.

When incorrectly labeled, non-impeding objects may cause an autonomous vehicle to stop in order to avoid impact with the object. However, many non-impeding objects are birds or gases which may be transient, move away from the vehicle, or not cause a risk of damage to the vehicle. Correct classification of such objects is related to safe operation of the vehicle balanced with efficient movement of the vehicle through an environment. The disclosed techniques have been found to enable labeling of such objects to a high degree of accuracy so support autonomous vehicle operations.

In various examples, a system may train a machine-learned model to perform small, dynamic, non-impeding object auto-labeling using a training dataset that includes data representing sensor data collected in an environment. For example, such data may include lidar data associated with one or more lidar points (e.g., reflections of one or more lidar pulses). The lidar data in a training dataset may represent groups of one or more lidar points referred to as "lidar segments." Lidar segments may be groups of one or more lidar points that are (e.g., geographically, physically) proximate to one another and/or have other similar characteristics that may indicate such points may be associated with a particular object. In various examples, a lidar segment may include at least a threshold quantity of lidar points to be included as a segment in a training dataset. For example, individual segments in a dataset may be associated with two or more lidar points, three or more lidar points, four or more lidar points, etc. Alternatively, segments in a dataset may be associated with one or more lidar points (e.g., a segment may include one lidar point and/or associated data). Alternatively or additionally, individual lidar points and associated data may be included in a dataset along with, or instead of, lidar segments. In such examples, individual lidar points and associated data may be processed as described herein, while in other examples, individual lidar points and associated data may be filtered from the dataset before processing segments associated with the dataset as described herein.

The data associated with individual lidar points and/or lidar segments in a training dataset may include one or more labels and/or an indication that respective points and/or segments are unlabeled. The data associated with individual lidar points and/or lidar segments in a training dataset may also, or instead include an indication of whether respective points and/or segments are located within, or sufficiently proximate to (e.g., within a threshold distance of), a drivable region (e.g., road, street, highway, driveway, parking lot, etc.) in an environment associated with a vehicle represented by the training data. The data associated with individual lidar points and/or lidar segments in a training dataset may also, or instead, include an indication of whether respective points and/or segments are not located within, or sufficiently proximate to (e.g., within a threshold distance of), a drivable region in an environment associated with a vehicle represented by the training data (e.g., the points and/or segments are associated with a non-drivable region of the environment). The data associated with individual lidar points and/or lidar segments in a training dataset may also, or instead, include other data that may be used by the system to determine or otherwise obtain data associated with the individual lidar points and/or lidar segments, including, but not limited to, object label and/or classification, location (e.g., that may be used to determine if the point or segment is within a drivable region), position, and/or other data as described herein.

For instance, the data associated with individual lidar points and/or lidar segments in a training dataset may include intensity data associated with such points and/or segments. The system may use such intensity data to determine whether the object associated with the point or segment is likely to be a solid object. In some examples, determining whether an object associated with the point or segment is solid may include determining a probability that the object is solid. Alternatively or additionally, the data associated with individual lidar points and/or lidar segments may include other data that the system may use to determine an associated intensity and/or whether, and/or a probability that, the object associated with the point or segment is solid.

The data associated with individual lidar points and/or lidar segments in a training dataset may also, or instead, include data indicating a probability that the associated point and/or segment is at rest. This may be referred to as a "static probability." Alternatively or additionally, the data associated with individual lidar points and/or lidar segments may include data indicating that the associated point and/or segment is in motion and/or is at rest. Alternatively or additionally, the data associated with individual lidar points and/or lidar segments include data allowing the system to determine whether the associated point and/or segment is in motion or at rest and/or data allowing the system to determine a static probability for the associated point and/or segment.

The data associated with individual lidar points and/or lidar segments in a training dataset may also, or instead, include data indicating a size (e.g., dimensions) of the object associated with the point and/or segment. Alternatively or additionally, the data associated with individual lidar points and/or lidar segments may include data that the system may use to determine a size (e.g., dimensions) of the object associated with the point and/or segment.

The data associated with individual lidar points and/or lidar segments in a training dataset may also, or instead, include data indicating whether, and/or a probability that, an object associated with the point and/or segment is within a region and/or is not within a region that is occluded from sensors associated with the vehicle represented by the training dataset (e.g., sensors associated with the sensor data on which the training dataset may be based). For example, a portion of the object may have reflected one or more lidar pulses while another portion of the object, obscured from lidar emissions by another object in the environment, may not have reflected the one or more lidar pulses. In a particular example, pulses may reflect off of the head of a person standing behind a car and not off of the remaining portion of the person's body that is behind the car from the perspective of the lidar emitter. Because a portion of such an object may be within a region of the environment that is occluded or obscured from the lidar emitter, that portion of the object may not have reflected the one or more lidar pulses, and therefore the data in the training dataset may not include data associated with that portion of the object. The data for individual lidar points and/or lidar segments associated with such an object may include data indicating whether, and/or a probability that, the points and/or segments represent the entire object (e.g., no part of the object is within an occluded region) and/or whether, and/or a probability that, the points and/or segments represent a portion of the object (e.g., one or more parts of the object may be within an occluded region). Alternatively or additionally, the data associated with individual lidar points and/or lidar segments may include data that the system may use to determine whether, and/or a probability that, the associated point and/or segment is associated with an object that is at least partially within an occluded region. Examples of systems and methods for determining object occlusion are provided in U.S. patent application Ser. No. 16/399,743, filed Mar. 29, 2021, now U.S. Pat. No. 11,126,180, issued Sep. 21, 2021, entitled "Predicting an Occupancy Associated With Occluded Region," the entirety of which is incorporated herein by reference.

In various examples, the system (e.g., training the machine-learned model, among other functions) may determine the lidar segments and/or points in the training dataset that are associated with an existing label (e.g., indicating an object, point, or segment classification) and exclude those segments and/or points from the small, dynamic, non-impeding object auto-labeling training process. In other words, the system may determine those points and/or segments that are unlabeled in the dataset for use in small, dynamic, non-impeding object auto-labeling training.

To determine that one or more points and/or segments in the training data are associated with small, dynamic, non-impeding objects, and to label such points and/or segments accordingly, the system may determine whether the points and/or segments meet one or more criteria. If the points and/or segments meet the required criteria, the system may label such points and/or segments as small, dynamic, non-impeding objects. For points and/or segments that do not meet the required criteria, the system may not label such points and/or segments, leaving such labeling to a downstream classifier component, or may determine a label for such points and/or segments using one or more alternative techniques. Alternatively, such points and/or segments may be associated with an indication that the points and/or segments are unlabeled and/or have not been labeled as being associated with a small, dynamic, non-impeding object.

For example, the system may determine whether the location of a point and/or segment in an environment is on a drivable region as a criteria for determining whether to further evaluate the point and/or segment for labeling associated with a small, dynamic, non-impeding object. In various examples, the system may determine, from among the unlabeled points and/or segments, the points and/or segments that are within a drivable region of a vehicle associated with the training dataset and/or the points and/or segments associated with a non-drivable region of the environment associated with the training dataset. For instance, the system may determine based on location data associated with such points and/or segments whether the location of the points and/or segments corresponds to a location of a drivable region in an environment represented in the training dataset. In some examples, the system may use map data stored at the system and/or received from a vehicle (e.g., via simultaneous localization and mapping (SLAM) or other mapping techniques conducted at the vehicle) to make this determination. Alternatively or additionally, the system may determine based on location data associated with such points and/or segments whether the location of the points and/or segments corresponds to at track, path, and/or trajectory associated with the vehicle represented in the training dataset. Alternatively or additionally, the system may determine whether data associated with such points and/or segments in the training dataset indicates that the points and/or segments are located in a drivable region or a non-drivable region. Other techniques for determining whether a particular point and/or segment is within a drivable region or a non-drivable region may also, or instead, be used. The system may then exclude those segments and/or points that are not located in a drivable region from the small, dynamic, non-impeding object auto-labeling training process. In other words, the system may determine those points and/or segments that are in a drivable region in the dataset for use in small, dynamic, non-impeding object auto-labeling training. Alternately or additionally, the system may determine to not label as being associated with a small, dynamic, non-impeding object those points and/or segments that are not in a drivable region.

In various examples, the system may also, or instead, determine whether the object associated with the point and/or segment in an environment is solid as a criteria for determining whether to label a point and/or segment as being associated with a small, dynamic, non-impeding object label. To make this determination, the system may determine an intensity value for the individual unlabeled points and/or segments in the training dataset. An intensity value may represent the strength of one or more return lidar pulses. In various examples, an intensity value for a lidar point may be a ratio of the strength of the return lidar pulse to the strength of emitted lidar pulse. In various examples, lidar intensity may be represented by an integer value from zero to 255 representing this ratio. The intensity value may indicate a reflectivity of a surface. For example, a lower number indicates less of the emitted light was reflected by the surface (e.g., lower reflectivity surface) while a higher number indicates more of the emitted light was reflected by the surface (e.g., higher reflectivity surface). In this example, zero intensity may indicate that no light was reflected from a surface while an intensity of 255 may indicate that 100% of the emitted light was reflected from a surface. The system may use the intensity value to determine whether, or a probability that, an object associated with the respective unlabeled points and/or segments in the drivable region is a solid object. In other examples, a system may not determine whether an object is solid in determining whether such an object is a small, dynamic, non-impeding object.

For example, the system may determine, based on the sensor data represented in the training dataset, a lidar intensity value for the individual points and/or segments that are located in a drivable region. In various examples, the intensity of a particular lidar segment may be an aggregate intensity value based on one or more individual intensity values for one or more individual lidar points associated with the particular lidar segment. For instance, an intensity value for a particular lidar segment may be an average of one or more individual intensity values for one or more individual lidar points associated with the particular lidar segment. One or more algorithms and/or techniques may be used to determine an intensity value for a lidar segment. In various examples, one or more lidar segment intensity values may be provided in the training dataset, while in other examples, the system may instead, or also, determine one or more lidar segment intensity values based on other data in the training dataset. Using the determined intensity values for the unlabeled points and/or segments, the system may determine whether the associated objects are solid (e.g., have a probability of being solid above a threshold value). For example, the system may determine that an intensity value above a particular threshold may indicate that the associated object is solid, while an intensity value at or below that threshold may indicate that the associated object is non-solid. The system may determine not to label those points and/or segments that are associated with a non-solid object as being associated with a small, dynamic, non-impeding object (e.g., may defer labeling such points/segments to one or more other classifiers and/or may associate such points/segments with an indication that they are unlabeled and/or have not been labeled as being associated with a small, dynamic, non-impeding object).

In various examples, the system may also, or instead, determine whether the object associated with the point and/or segment is dynamic (e.g., in motion) as a criteria for determining whether to label a point and/or segment as being associated with a small, dynamic, non-impeding object label. In various examples, for individual unlabeled points and/or segments, the system may determine whether, and/or a probability that, the associated object is dynamic.

This determination may be based on static probability data as described above and/or other data included in the training dataset. For example, a static probability may be associated with individual lidar points and/or segments. A static probability for a segment may be based on aggregated static probabilities of the associated lidar points (e.g., an average of the static probabilities associated with the lidar points of the segment). A static probability be a unitless normalized value received from a lidar sensor indicating a relative amount of motion for an associated lidar point (e.g., zero may indicate no probability that the associated object is in motion, while 255 may indicate a 100% probability that the associated object is in motion). The system may determine whether a static probability associated with a segment or point meets or exceeds a threshold static probability value (e.g., 50%, 75%, 90%, etc.). If so, the system may determine that the object is dynamic.

Alternatively or additionally, the system may use positions and/or locations of points, segments, and/or associated objects over time to determine whether the objects are in motion. In examples, data from scenes captured by one or more sensors (lidar, radar, sonar, cameras, etc.) over time may be evaluated to determine changes in the scenes of overtime. Object positions overtime (e.g., cross the scenes) may be evaluated to determine whether such objects are dynamic. For example, objects having positions that remain unchanged over time may be determined to be static objects while objects having positions that change over time may be determined to be dynamic. Alternatively or additionally, instantaneous velocity data from one or more sensors (e.g., radar, sonar, lidar, etc.) may be used to determine whether points, segments, and/or associated objects are dynamic. In various examples, static objects may be filtered from the training dataset before performing labeling determinations as described herein.

In various examples, the system may determine whether a dynamic object is sufficiently dynamic. For example, a very small object that is moving quickly (e.g., a bird) may be appropriately labeled as a small, dynamic, non-impeding object, while a similarly sized object that is moving slowly (e.g., a small turtle) may not be labeled as a small, dynamic, non-impeding object. In various examples, the velocity of an object may be determined and compared to a velocity threshold. If the object is moving at a velocity greater than the velocity threshold, the object and/or its associated segments/points may be labeled as being associated with a small, dynamic, non-impeding object. If the object is moving at a velocity lower than or at the velocity threshold, the object and/or its associated segments/points may not be labeled as being associated with a small, dynamic, non-impeding object. The velocity threshold may be a based on the (e.g., current) velocity of the vehicle and/or may otherwise be relative to the speed of the vehicle. For example, if the vehicle is traveling at a higher speed, the object's velocity threshold may be set higher because there would be less time for the object to move out of the path of the vehicle before it encounters the vehicle, and vice versa. Thus, the system may take into account the relative speed of motion of a dynamic object in determining whether the associated point and/or segment may be labeled as being associated with a small, dynamic, non-impeding object label. The system may determine not to label those points and/or segments that are associated with a stationary and/or insufficiently dynamic object as being associated with a small, dynamic, non-impeding object (e.g., may defer labeling such points/segments to one or more other classifiers and/or may associate such points/segments with an indication that they are unlabeled and/or have not been labeled as being associated with a small, dynamic, non-impeding object).

In various examples, the system may also, or instead, determine whether the object associated with the point and/or segment is (e.g., relatively) small as a criteria for determining whether to label a point and/or segment as being associated with a small, dynamic, non-impeding object label. In various examples, for individual unlabeled points and/or segments, the system may determine a size (e.g., an estimated size, estimated dimensions) for an associated object. The system may determine whether, and/or a probability that, the determined size is associated with a relatively small object. For example, the size may be compared to a threshold size and an object at or above such a threshold may be determined to be too large to be associated with a small, dynamic, non-impeding object label, while an object of a size smaller than such a threshold may be determined to be eligible to be associated with a small, dynamic, non-impeding object label. Examples of such threshold sizes include one cubic meter, one cubic foot, and any fractions thereof. If the determined size is sufficiently small, the system may determine that the point and/or segment is eligible to be associated with a small, dynamic, non-impeding object label.

This size determination may also, or instead, be based on a number of points associated with an object or with a segment. For example, a single point, or a segment associated with only a single point, may be determined to be associated with an object that is small enough to be eligible to be associated with a small, dynamic, non-impeding object label. Similarly, a segment associated with a number of points below a threshold number of points (e.g., five points, ten points) may be determined to be associated with an object that is sufficiently small to be eligible to be associated with a small, dynamic, non-impeding object label. In various examples, a point or segment entirely within a single portion of the environment (e.g., a representation thereof, such as a voxel) may be determined to be small enough to be eligible to be associated with a small, dynamic, non-impeding object label. The system may determine not to label those points and/or segments that are associated with an object that is not sufficiently small in size as being associated with a small, dynamic, non-impeding object (e.g., may defer labeling such points/segments to one or more other classifiers and/or may associate such points/segments with an indication that they are unlabeled and/or have not been labeled as being associated with a small, dynamic, non-impeding object).

In various examples, the system may also, or instead, determine whether the object associated with the point and/or segment, or any portion thereof, is, or has a sufficient probability of being, within an occluded region ("is occluded") as a criteria for determining whether to label a point and/or segment as being associated with a small, dynamic, non-impeding object label. In various examples, for individual unlabeled points and/or segments, the system may determine whether, and/or a probability that, the any portion of the associated object is occluded. This determination may be based data in the training dataset that indicates whether, or a probability that, (e.g., substantially) an entire object is represented by a point or segment in the dataset. Alternatively or additionally, this determination may be based data in the training dataset that indicates whether, or a probability that, at least a portion of an object associated with a point or segment in the dataset is not represented by the point or segment. The system may determine not to label those points and/or segments that are associated with an object that (e.g., likely) has one or more portions within an occluded region as being associated with a small, dynamic, non-impeding object (e.g., may defer labeling such points/segments to one or more other classifiers and/or may associate such points/segments with an indication that they are unlabeled and/or have not been labeled as being associated with a small, dynamic, non-impeding object).

In various examples, the system may label those points and/or segments that meet all such small, dynamic, non-impeding object criteria with a label indicating that such points and/or segments are associated with a small, dynamic, non-impeding object. Alternatively or additionally, the system may label those points and/or segments that meet a subset of such small, dynamic, non-impeding object criteria with a label indicating that such points and/or segments are associated with a small, dynamic, non-impeding object. Alternatively or additionally, the system may label those points and/or segments that meet a subset of such small, dynamic, non-impeding object criteria and one or more additional criteria with a label indicating that such points and/or segments are associated with a small, dynamic, non-impeding object. Those points and/or segments that do not meet the small, dynamic, non-impeding object criteria as determined by the system may remain unlabeled. Alternatively, points and/or segments that do not meet the small, dynamic, non-impeding object criteria as determined by the system may be associated with an indication that such points and/or segments are unlabeled and/or have not been labeled as being associated with a small, dynamic, non-impeding object.

In various examples, the system may rely on one or more other classification models and/or systems to label those points and/or segments that remain unlabeled or are have not been labeled as being associated with a small, dynamic, non-impeding object. In such examples, when the machine-learned model is executed following training, the system may classify or otherwise label all individual lidar segments and/or points and/or the associated objects that are detected in an environment using lidar sensors.

In various examples, a machine-learned model may be trained as described herein for sensor data other than lidar data. For example, vision data, sonar data, and/or radar data may be used in training a machine-learned model as described herein.

In various examples, a machine-learned model trained as described herein may be executed using input from individual sensors (e.g., lidar, sonar, radar, vision) and/or one or more associated components. In various examples, a lidar perception system that may receive lidar data from one or more lidar sensors may also, or instead, execute a machine-learned model trained as described herein. In various examples, other perception systems that may receive other types of data (e.g., lidar, sonar, radar, vision) from one or more sensors may also, or instead, execute a machine-learned model trained as described herein. In various examples, one or more such machine-learned models trained as described herein may be executed by one or more such systems configured at a vehicle, such as an autonomous vehicle.

A vehicle according to the disclosed examples may be configured with sensor systems may be configured at a vehicle that includes one or more emitters and one or more sensors. For example, a lidar system may be configured at a vehicle that includes one or more lidar emitters and one or more lidar sensors. The lidar system may emit lidar pulses into an environment and receive return pulses at the one or more lidar sensors that have been reflected by various objects in the environment into which the lidar pulses were emitted. The lidar system and/or a vehicle computing system configured at the vehicle may detect objects in the environment using these return pulse(s). As noted, individual lidar sensors may be configured with a machine-learned model trained as described herein to auto-label small, dynamic, non-impeding objects. The lidar sensors may collect, generate, and/or determine lidar data as described herein, for example, using one or more machine-learned models. Other sensor types and systems (e.g., lidar, sonar, radar, vision) may also, or instead, be configured at such a vehicle that may be configured with a machine-learned model trained as described herein to auto-label small, dynamic, non-impeding objects using data received and/or generated by such sensor types and systems.

A vehicle computing system may use lidar data collected, generated, and/or determined by such one or more lidar sensors to categorize objects detected in an environment. For example, a vehicle computing system may determine labels for lidar segments that may then be used to indicate associated types of objects, such as pedestrians, cars, trucks, bicycles, etc. The vehicle computing system may also, or instead, determine labels based on other types of sensor data (e.g., lidar, sonar, radar, vision). In various examples, the vehicle computing system may use one or more machine-learned models trained as described herein to determine that one or more objects detected in an environment are small, dynamic, non-impeding objects. The vehicle computing system may execute the one or more machine-learned models trained as described herein in conjunction with one or more other classifiers, consistency components, and segmentation systems to make such determinations. The vehicle computing system may base such determinations on sensor data received from one or more sensors as described herein. The vehicle computing system may label or otherwise categorize such objects with a "small, dynamic, non-impeding" label or tag.

The resulting data determined using the disclosed techniques, including labels and associated points/segments and/or unlabeled points/segments, may be used to train one or more machine-learned models to preform various operations. For example, the labeled small, dynamic non-impeding object data determined herein may be used as training data to improve the operations performed by a machine-learned model for identification and classification of small, dynamic non-impeding objects. Examples of training a machined-learned model to detect non-impeding objects and performing an associated labeling process are provided in U.S. patent application Ser. No. 17/661,075, filed Apr. 28, 2022, entitled "Object Detection Soft Consistency Checker," the entirety of which is incorporated herein by reference. Further examples of training a machined-learned model and performing a labeling process are provided in U.S. patent application Ser. No. 17/215,938, filed Mar. 29, 2021, entitled "Hierarchical Machine-Learning Network Architecture," the entirety of which is incorporated herein by reference.

When a machine-learned model trained according to the disclosed techniques is executed in a vehicle computing system, the model may perform small, non-impeding object determinations and labeling that may be used to control the vehicle. For example, based on the small, dynamic, non-impeding object determinations and labeling, the vehicle computing system may determine a vehicle trajectory that handles an object determined to be a small, dynamic, non-impeding object by disregarding the object when planning a vehicle trajectory or adjusting a vehicle trajectory based on the object being a small, dynamic, non-impeding object (e.g., slowing down rather than stopping). Additionally or alternatively, the perception component that determines whether an object is small, dynamic, and non-impeding may provide a confidence score associated with the small, dynamic, non-impeding object indication to a planning component of the vehicle. In such an example, the planning component may use the confidence score as a cost, among multiple costs considered, in determining a trajectory for the vehicle. Additionally or alternatively, based on the disclosed small, dynamic, non-impeding object detection and labeling operations, the vehicle computing system may determine that an object in the environment is likely not a small, dynamic, non-impeding object (e.g., is instead likely an impeding, relatively large, and/or stationary solid object) and may then generate or adjust a vehicle trajectory to treat the object as an impeding object or some other type of object having one or more solid surfaces. For example, the vehicle computing system may adjust or generate a trajectory to navigate the vehicle around the impeding object or stop the vehicle before encountering the impeding object.

The systems and techniques described herein may be directed to training and leveraging machine-learned models, lidar data, and associated data to improve object detection used by a vehicle, such as an autonomous vehicle, in an environment. More specifically, the disclosed systems and techniques may be directed to facilitating more accurate detection of small, dynamic, non-impeding objects and reducing false designations of solid or otherwise travel-impeding objects as non-impeding objects. Using this improved data, such a vehicle may generate safer and more efficient trajectories for use in navigating through an environment. In particular examples, the systems and techniques described herein can utilize lidar and/or other sensor data training datasets to train machine-learned models to more accurately and efficiently determine whether objects in an environment are small, dynamic, non-impeding objects. By using these models trained according to the disclosed examples, vehicle computing systems may more accurately distinguish between solid objects that may present a hazard to an autonomous vehicle and small, dynamic, non-impeding objects that may be safely disregarded or otherwise handled differently than impeding objects. The examples described herein may result in increased certainty and accuracy in object detections, thereby allowing an autonomous vehicle to generate more accurate and/or safer trajectories for the autonomous vehicle to traverse in the environment.

For example, techniques described herein may increase the reliability of the determination of the solidity of objects in the environment, reducing the likelihood of inaccurately designating an object as a non-impeding object or a solid object. That is, the techniques described herein provide a technological improvement over existing object detection, classification, tracking, and/or navigation technology. In addition to improving the accuracy of object detections and classifications of such objects, the systems and techniques described herein can provide a smoother ride and improve safety outcomes by, for example, more accurately providing safe passage to an intended destination through an environment that is also occupied by one or more objects that may include small, dynamic, non-impeding objects. Moreover, the systems and techniques may prevent unnecessary braking or hard-braking to avoid objects that can safely be passed through.

The techniques described herein may also improve the operation of computing systems and increase resource utilization efficiency. For example, computing systems, such as vehicle computing systems, may more efficiently perform small, dynamic, non-impeding object determinations using one or more machine-learned models trained according to the techniques described herein because, by auto-labeling small, dynamic, non-impeding objects using such a model, the disclosed examples may reduce the amount of manual labeling required to generate subsequent training datasets. The disclosed examples may also reduce the data processing required to determine and label small, dynamic, non-impeding objects because the machine-learned models trained according to the disclosed examples may increase the accuracy of such determinations, thereby reducing the need to correct and/or adjust labeling by other systems and processes (e.g., consistency checking components) associated with a vehicle computing systems. This reduction in extraneous processing therefore increases the overall efficiency of such systems over what would be possible using conventional techniques. Moreover, the techniques discussed herein may reduce the amount of data used by computing systems to determine and process object labels as the number of labels applied to various objects may be reduced due to improved initial auto-labeling, which may reduce latency, memory usage, power, time, and/or computing cycles required to detect and categorize objects detected in an environment.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, although discussed in the context of pulses originating as lidar emissions, detection using lidar sensors, and processing using lidar sensor and lidar point data, other types of sensors and emitters are contemplated, as well as other types of sensor data (e.g., lidar, sonar, radar, vision). Furthermore, the disclosed systems and techniques may include using various types of components and various types of data and data structures, including, but not limited to, various types of image data and/or sensor data (e.g., stereo cameras, time-of-flight data, radar data, sonar data, and the like). For example, the techniques may be applied to any such sensor systems. Additionally, the techniques described herein can be used with real data (e.g., captured using sensor(s)), simulated data (e.g., generated by a simulator), or any combination of the two.

Figure 5:
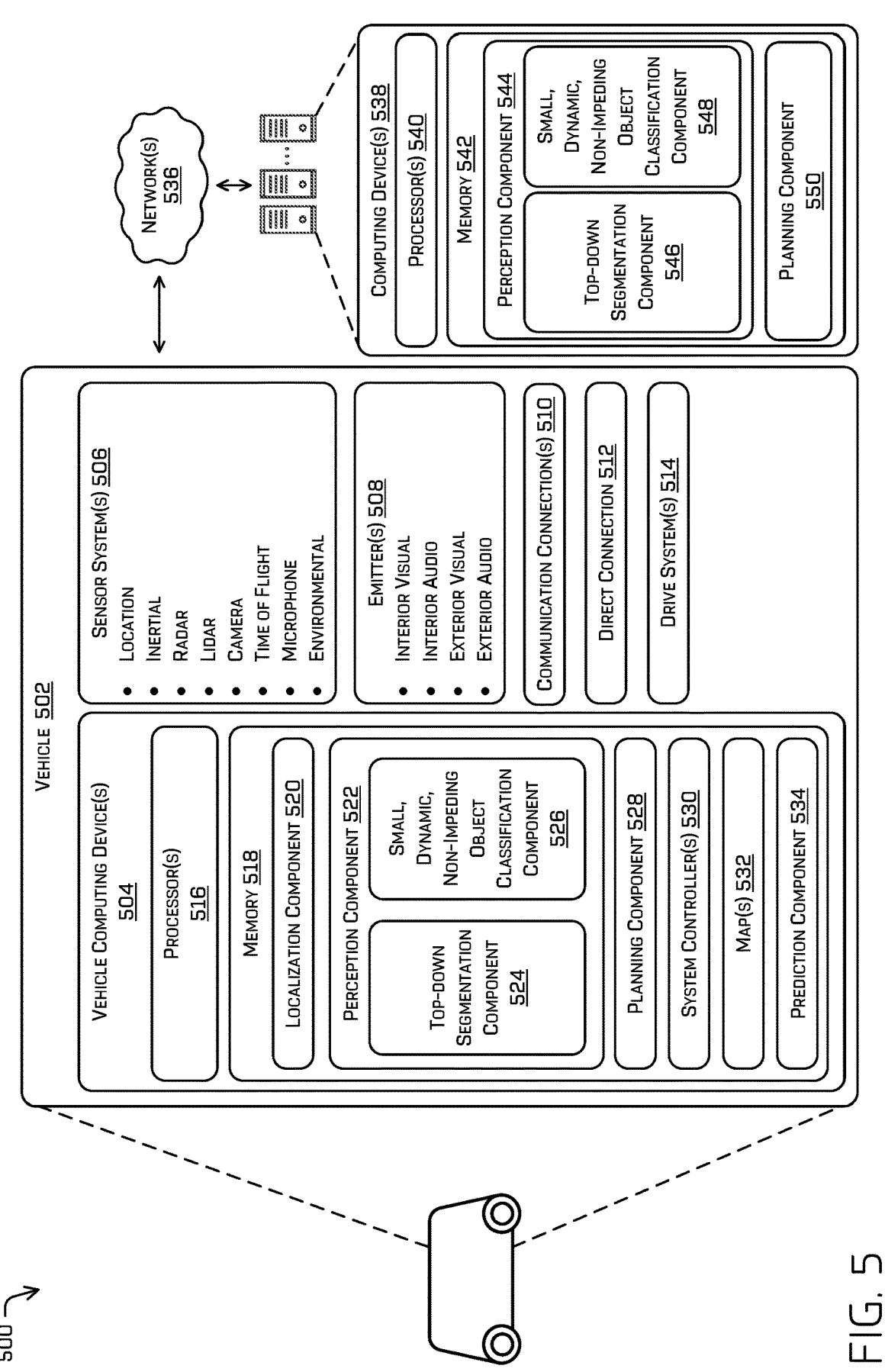
FIG. 5 is a block diagram of an example system for implementing the techniques described herein.

FIG. 1 is a pictorial flow diagram of an example process 100 for training a machine-learned model to determine whether and how to auto-label lidar segments based on various criteria, for example as small, dynamic, non-impeding objects, based on lidar data representing data detected in an environment in which a vehicle may be operating. In some examples, one or more operations of the process 100 may be implemented by a vehicle computing system, such as by using one or more of the components and systems illustrated in FIGS. 3-5 and described below. For example, one or more components and systems can include those associated with one or more of the one or more sensor systems 404 and 506, one or more of the perception components 304, 406, and 522, and/or one or more of the planning components 418 and 528. In some examples, the one or more operations of the process 100 may also, or instead, be performed by a remote system in communication with a vehicle, such as the perception component 544 and/or planning component 550 of the computing device(s) 538 illustrated in FIG. 5. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 3-5 are not limited to performing the process 100.

At operation 102, a training dataset may be received at a machine-learned model training and/or execution system (e.g., a vehicle computing system). In particular examples, this training dataset may include sensor data such as lidar data. The lidar data in such a training dataset may represent data determined by a lidar system that emitted one or more lidar pulses into an environment with one or more lidar emitters and detected one or more return pulses with one or more lidar sensors (e.g., photodetectors). For example, such data may include one or more lidar segments and/or lidar points. Individual lidar segments may be composed of one or more associated (e.g., proximate) lidar points. In examples, one or more lidar points that are within a threshold distance of one another and/or share one or more common properties may be grouped into a lidar segment. Such lidar segments may represent candidate objects, for example, lidar points that are likely to be associated with a particular object based on having similar characteristics (e.g., location, lidar characteristics). The training dataset received at operation 102 may represent a top-down gird of cells where individual cells may be associated with one or more lidar segments. Lidar segment data, such as location data, label data, intensity data, object motion data, object size data, object occlusion data, etc., may also be associated with particular cells.

The training dataset may include label data associated with the represented lidar points and/or segments. For example, one or more individual points and/or segments represented in the training dataset may be labeled with an indicator of a particular object type (e.g., car, bus, bicycle, pedestrian), while one or more other individual segments may not be labeled. In various examples, it is these unlabeled lidar segments that the machine-learned model may be trained to determine whether to auto-label as small, dynamic, non-impeding objects as described herein. In various examples, the training dataset may not include label data (e.g., may include only unlabeled points/segments).

To determine labels for such unlabeled lidar segments, the system may use one or more pieces of data associated with the points and/or segments that may be included in the training data set received at operation 102. For example, the training dataset may include location data, label data, intensity data, object motion data, object size data, object occlusion data, etc. for one or more of the individual represented lidar points and/or segments. The training dataset may also, or instead, include an indication of whether the individual lidar segments are associated with a drivable region of the environment and/or a non-drivable region of the environment. For example, such an indication may indicate whether a particular lidar segment (e.g., one or more of the lidar points associated with the segment, a majority of the lidar points associated with the segment) is located within, or sufficiently proximate to, a drivable region associated with a vehicle associated with the training data. Alternatively or additionally, the training dataset may include location data associated with one or more lidar segments that the system may use to determine whether individual particular lidar segments are associated with a drivable region of the environment.

At operation 104, the system (e.g., training the machine-learned model) may determine one or more lidar segments represented in the training dataset that are labeled and one or more lidar segments represented in the training dataset that are unlabeled. For example, one or more of the points and/or segments represented in the training dataset may be labeled indicating, for example, an object classification (e.g., pedestrian, bus, car, bicycle), while one or more other segments represented in the training dataset may not be labeled with an object classification. The system may determine the unlabeled lidar segments from the training dataset for use in the process 100. In various examples, the training dataset may have no labels, that is, none of the lidar points/segments may have associated labels (e.g., all lidar segments in the training dataset are unlabeled lidar segments), while in other examples, one or more of the lidar points/segments represented in the training dataset may have associated labels.

An example 106 illustrates an example of such training data that may represent a top-down view of an environment in which a vehicle 108 may be traveling. In this example, the training dataset may represent data collected and/or determined by a lidar system configured at the vehicle 108. The training dataset may be a multichannel top-down image, for example, encoded by a lidar system, perception system, and/or vehicle computing system configured at the vehicle 108. A vehicle 110 and a pedestrian 112 may be represented in the training dataset as lidar segments within the environment and labeled accordingly (e.g., may have associated object label data oi the training dataset). The training dataset of the example 106 may also include one or more unlabeled lidar segments, such as unlabeled lidar segments 114, 116, and 118. Any one or more of unlabeled lidar segments 114, 116, and 118 may be an individual lidar point. The lidar segments 114, 116, 118 may be transformed or modeled as multichannel top-down image(s) wherein lidar data is stored or otherwise represented from a two-dimensional top-down perspective of an environment. Channels of a multi-channel image can respectively encode different features in the environment (e.g., velocity information, classification information, heigh information, etc.). Such images can readily be processed using graphical processing units and related techniques.

At operation 120, the system may determine whether unlabeled lidar point and/or segments in the training dataset are associated with a drivable region. For example, the system may compare location data associated with individual unlabeled lidar points and/or segments (e.g., included in the training dataset or otherwise obtained or determined) to map data and/or vehicle trajectory data (e.g., included in the training data set or otherwise obtained or determined) to determine whether the individual unlabeled lidar points and/or segments are associated with a drivable region. Alternatively, the training dataset may include data indicating whether one or more individual unlabeled lidar points and/or segments are associated with a drivable region.

At operation 122, the system may determine one or more properties of the unlabeled lidar points and/or segments in the training dataset that are located on a drivable region. For example, the system may determine, based on the lidar data in the training dataset, a lidar intensity value for the individual unlabeled lidar points and/or segments that are located in a drivable region. The system may then use the determined intensity values to determine whether the respective points and/or segments are associated with a solid object. As noted herein, the lidar intensity value associated with an individual lidar segment may be an aggregate intensity value based on one or more individual intensity values for one or more individual lidar points associated with the respective individual lidar segment.

Further at operation 122, the system may determine one or more other characteristics of the unlabeled lidar points and/or segments in the training dataset that are located on a drivable region. For example, the system may determine, based on the lidar data in the training dataset, a size of an object associated with the unlabeled lidar points and/or segments, a motion characteristic (e.g., static probability) for an object associated with the unlabeled lidar points and/or segments, an occlusion characteristic for an object associated with the unlabeled lidar points and/or segments, and/or one or more other characteristics and/or properties of unlabeled lidar points and/or segments in the training dataset and/or objects associated therewith.

At operation 124, the system may use the determined characteristics of the unlabeled lidar points and/or segments in the training dataset located on a drivable region to determine whether to label such points and/or segments as being associated with a small, dynamic, non-impeding object. For those unlabeled lidar points and/or segments that are located in a non-drivable region, the system may also determine to not label the segments.

For example, the system may determine if the determined characteristics of an unlabeled lidar point or segment located on a drivable region meets (e.g., all) the criteria associated with a small, dynamic, non-impeding object label and, if so, the system may apply a label associated with a small, dynamic, non-impeding object to that point or segment at operation 124. For those unlabeled lidar points and/or segments that are located in a drivable region and do not meet such criteria, the system may determine to not label the segments. Alternatively, the system may defer labeling such points/segments to one or more other classifiers and/or may associate such points/segments with an indication that they are unlabeled and/or have not been labeled as being associated with a small, dynamic, non-impeding object.

In various examples, the system may determine, at operation 124, that an unlabeled lidar point or segment located on a drivable region meets all of a size criterium (e.g., is smaller than a threshold size), a motion criterium (e.g., is sufficiently dynamic), and an occlusion criterium (e.g., is not occluded). Based on determining that the unlabeled lidar point or segment located on a drivable region meets such criteria, the system may apply a label associated with a small, dynamic, non-impeding object to that point or segment. A more detailed example of the process of determining whether and how to label unlabeled lidar segments that are associated with a non-drivable region based on particular criteria is described herein in regard to FIG. 2.

An example 126 illustrates an example of the resulting labeling applied (or not) to the unlabeled lidar segments of the training data set represented in the example 106. In this example, the system has determined from the training dataset that the region 128 is a drivable region in the environment represented by the training dataset and that region 130 a non-drivable region in the environment.

The system has further determined that the unlabeled lidar segment 114 is in the non-drivable region 130 (e.g., is not on a drivable region) and therefore may determine to leave unlabeled the unlabeled lidar segment 114. Therefore, the system may not apply a label to the unlabeled lidar segment

114. Alternatively, the system may associate an "unlabeled" indicator 132 or other label to the unlabeled lidar segment 114.

As also shown in this example, the system has further determined that the unlabeled lidar segment 116 is within or sufficiently proximate to the drivable region 128. Furthermore, the system has determined that the unlabeled lidar segment 116 has characteristics and/or properties that meet the small, dynamic, non-impeding object criteria and therefore has applied the "bird" label 134 (referring to the small, dynamic, non-impeding object label) to the formerly unlabeled lidar segment 116.

As further shown in example 126, the system has further determined that the unlabeled lidar segment 118 is within or sufficiently proximate to the drivable region 128. Furthermore, the system has determined that the unlabeled lidar segment 118 may be associated with a small and/or dynamic object but is obscured. For example, the unlabeled lidar segment 118 may be associated with a pedestrian that is behind the vehicle 110 such that only the pedestrian's head is detectable by the lidar sensors of the vehicle 108. This may be reflected in the training dataset and/or determined by the system training the machine-learned model. Therefore, the system may not apply a label to the unlabeled lidar segment 118. Alternatively, the system may associate an "unlabeled" indicator 136 or other label to the unlabeled lidar segment 118.

In various embodiments, the lidar segment data generated at operation 124 may be used to further train the machine-learning model. For example, this data may be recursively provided as training data the machine-learned model that generated the data to further refine the training of the machine-learned model. In examples, the data may include lidar points and/or segments that remain unlabeled and/or were otherwise not labeled by this machine-learned model. The machine-learned model may recursively process such data to determine one or more labels for such points and/or segments.

Figure 2:
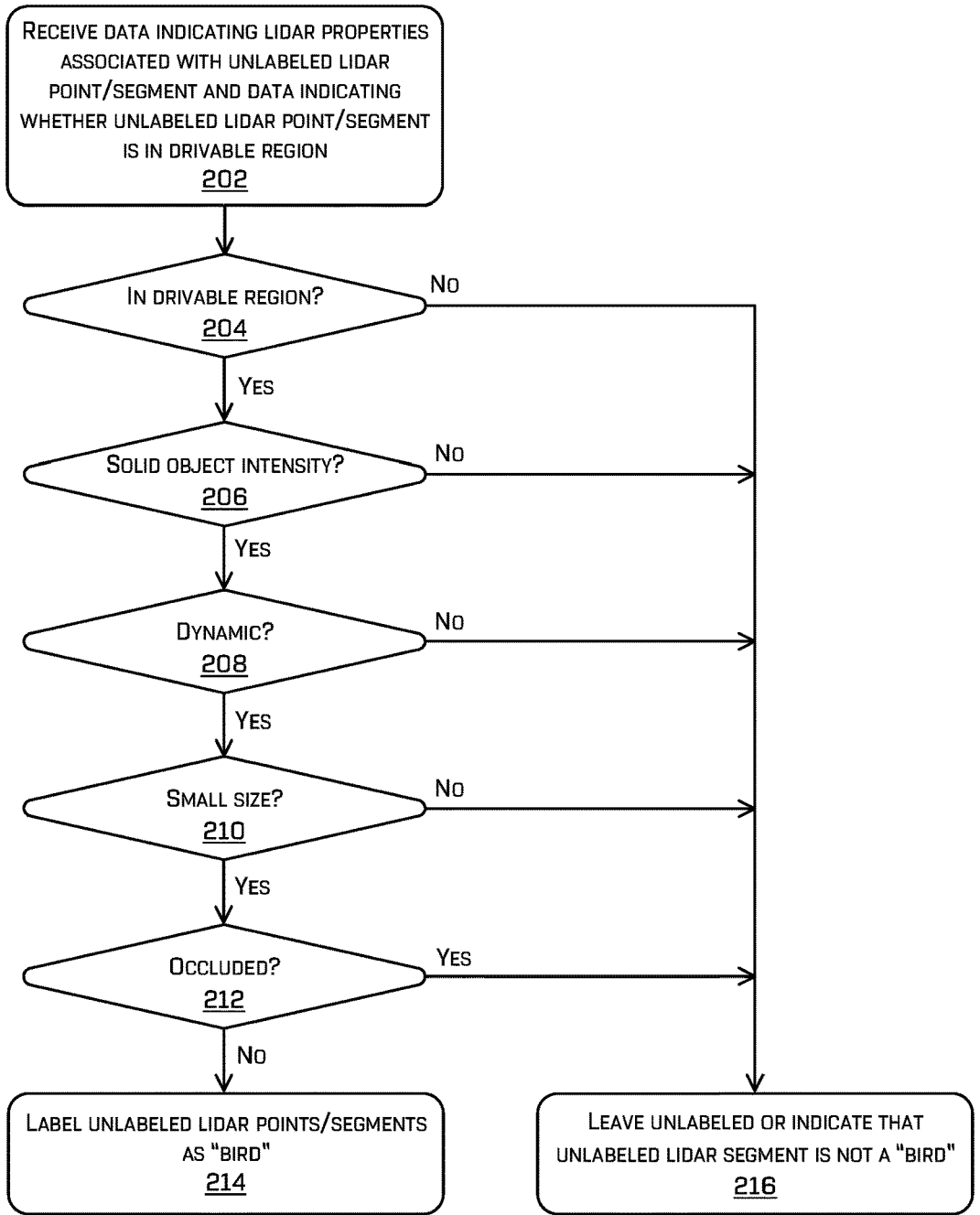
FIG. 2 is a flow diagram of an example process for determining an object classification for unlabeled lidar segments, in accordance with examples of the disclosure.

FIG. 2 is a flow diagram of an example process 200 for training a machine-learned model to determine and auto-label lidar points and segments based on small, dynamic, non-impeding object criteria. In some examples, one or more operations of the process 200 may be implemented by a vehicle computing system, such as by using one or more of the components and systems illustrated in FIGS. 3-5 and described below. For example, one or more components and systems can include those associated with one or more of the one or more sensor systems 404 and 506, one or more of the perception components 304, 406, and 522, and/or one or more of the planning components 418 and 528. In some examples, the one or more operations of the process 100 may also, or instead, be performed by a remote system in communication with a vehicle, such as the perception component 544 and/or planning component 550 of the computing device(s) 538 illustrated in FIG. 5. Such processes may also, in turn, be performed by the device itself (e.g., using onboard electronics) such that a standalone device may produce such signals without the need for additional computational resources. In still other examples, the one or more operations of the process 200 may be performed by a combination of a remote system and a vehicle computing systems. However, the process 200 is not limited to being performed by such components and systems, and the components and systems of FIGS. 3-5 are not limited to performing the process 200.

At operation 202, data may be received or otherwise determined (e.g., as performed at the operations of process

100 illustrated in FIG. 1) for unlabeled lidar segments in a training dataset. In various examples, this data may include location data, object solidity data, intensity data, object motion data, object size data, object occlusion data, etc. for one or more of the individual unlabeled lidar points and/or segments. This data may also, or instead, include an indication of whether the represented individual lidar segments are associated with a drivable region of the environment and/or a non-drivable region of the environment. As noted herein, such an indication may indicate whether a particular lidar segment (e.g., one or more of the lidar points associated with the segment, a majority of the lidar points associated with the segment) is located within, or sufficiently proximate to, a drivable region associated with a vehicle associated with the training data. Alternatively or additionally, location data associated with one or more lidar points and/or segments may be used by the system to determine whether individual points and/or segments are associated with a drivable region of the environment.

In the process 200, the system may evaluate various criteria associated with small, dynamic, non-impeding objects. Note that while the operations 204, 206, 208, 210, and 212 may be performed in the particular order shown in FIG. 2, the determinations of process 200 may be performed in any order and may include any subset of those shown in FIG. 2 and/or any additional determinations. For example, the order shown in FIG. 2 may be more efficient in various implementations (e.g., by removing points or segments associated with non-solid objects from the process before evaluating the remaining points or segments for size and motion), while in other implementations a different order may be more efficient (e.g., removing points or segments associated with stationary objects from the process before evaluating the remaining points or segments for solidity and whether they are on a drivable region). Various factors may be used to determine an efficient order of determinations, such as hardware and processing capabilities. All such variations of determination order are contemplated as within the scope of the instant disclosure.

At operation 204, the system may determine whether a particular unlabeled lidar point or segment for which data was received and/or determined at operation 202 is associated with a drivable region. If the point or segment is associated with a non-drivable region (e.g., not associated with a drivable region), at operation 216 the system may not label the unlabeled lidar point or segment and/or may defer labeling the unlabeled lidar point or segment to one or more other classifiers. Alternatively, at operation 216 the system may associate the unlabeled lidar point or segment with an indication that the unlabeled lidar point or segment is unlabeled and/or has not been labeled as being associated with a small, dynamic, non-impeding object. If the point or segment is on the drivable region, the system may perform one or more determinations using the various criteria associated with small, dynamic, non-impeding objects. Alternatively or additionally, if other criteria associated with small, dynamic, non-impeding objects have been met and/or if there are no other criteria associated with small, dynamic, non-impeding objects to be met, at operation 214 the system may label the unlabeled lidar point or segment as being associated with a small, dynamic, non-impeding object (e.g., with a "bird" label).

At operation 206, the system may determine whether a particular unlabeled lidar point or segment for which data was received and/or determined at operation 202 is associated with a solid object. As described above, the system may make this determination based on one or more intensity values associated with the point or segment. For example, the system may determine that the point or segment has an associated intensity value at or above a particular threshold and may responsively determine that the associated object is solid. In various examples, the system may perform operation 206 on those points and/or segments that have also met one or more other criteria, such as being associated with a drivable region as determined at operation 204. In various other examples, the system may perform operation 206 on those points and/or segments that have also met one or more criteria such as size, motion, and/or occlusion criteria. In various other examples, the system may perform operation 206 on points and/or segments that have not been determined to meet one or more other criteria.

If the point or segment is associated with a non-solid object, at operation 216 the system may not label the unlabeled lidar segment and/or may label or otherwise indicate that the unlabeled lidar segment unlabeled or otherwise not associated with a small, dynamic, non-impeding object label. If the point or segment is determined to be associated with a solid object, the system may perform one or more determinations using the various criteria associated with small, dynamic, non-impeding objects. Alternatively or additionally, if other criteria associated with small, dynamic, non-impeding objects have been met and/or if there are no other criteria associated with small, dynamic, non-impeding objects to be met, at operation 214 the system may label the unlabeled lidar point or segment as being associated with a small, dynamic, non-impeding object (e.g., with a "bird" label).

At operation 208, the system may determine whether a particular unlabeled lidar point or segment for which data was received and/or determined at operation 202 is associated with a dynamic object. As described above, the system may make this determination based on a static probability associated with the point or segment and/or based on other data. Also as noted above, the system may also, or instead, determine whether the associated object is sufficiently dynamic. In various examples, the system may perform operation 208 on those points and/or segments that have also met one or more other criteria, such as being associated with a drivable region as determined at operation 204 and/or being associated with a solid object at operation 206. In various other examples, the system may perform operation 208 on those points and/or segments that have also met one or more criteria such as size and/or occlusion criteria. In various other examples, the system may perform operation 208 on points and/or segments that have not been determined to meet one or more other criteria.

If the point or segment is associated with a stationary or insufficiently dynamic object, at operation 216 the system may not label the unlabeled lidar point or segment and/or may defer labeling the unlabeled lidar point or segment to one or more other classifiers. Alternatively, at operation 216 the system may associate the unlabeled lidar point or segment with an indication that the unlabeled lidar point or segment is unlabeled and/or has not been labeled as being associated with a small, dynamic, non-impeding object. If the point or segment is determined to be associated with a (e.g., sufficiently) dynamic object, the system may perform one or more determinations using the various criteria associated with small, dynamic, non-impeding objects. Alternatively or additionally, if other criteria associated with small, dynamic, non-impeding objects have been met and/or if there are no other criteria associated with small, dynamic, non-impeding objects to be met, at operation 214 the system may label the unlabeled lidar point or segment as being associated with a small, dynamic, non-impeding object (e.g., with a "bird" label).

At operation 210, the system may determine whether a particular unlabeled lidar point or segment for which data was received and/or determined at operation 202 is associated with a (e.g., sufficiently) small object. As described above, the system may make this determination based on various types of data associated with the point or segment and may determine whether the associated object is below a size threshold. In various examples, the system may perform operation 210 on those points and/or segments that have also met one or more other criteria, such as being associated with a drivable region as determined at operation 204, being associated with a solid object as determined at operation 206, and/or being associated with a sufficiently dynamic object as determined at operation 208. In various other examples, the system may perform operation 210 on those points and/or segments that have also met one or more criteria such as an occlusion criterion. In various other examples, the system may perform operation 210 on points and/or segments that have not been determined to meet one or more other criteria.

If the point or segment is associated with a large or otherwise insufficiently small object, at operation 216 the system may not label the unlabeled lidar point or segment and/or may defer labeling the unlabeled lidar point or segment to one or more other classifiers. Alternatively, at operation 216 the system may associate the unlabeled lidar point or segment with an indication that the unlabeled lidar point or segment is unlabeled and/or has not been labeled as being associated with a small, dynamic, non-impeding object. If the point or segment is determined to be associated with a (e.g., sufficiently) small object, the system may perform one or more determinations using the various criteria associated with small, dynamic, non-impeding objects. Alternatively or additionally, if other criteria associated with small, dynamic, non-impeding objects have been met and/or if there are no other criteria associated with small, dynamic, non-impeding objects to be met, at operation 214 the system may label the unlabeled lidar point or segment as being associated with a small, dynamic, non-impeding object (e.g., with a "bird" label).

At operation 212, the system may determine whether a particular unlabeled lidar point or segment for which data was received and/or determined at operation 202 is associated with an object within an occluded region. As described above, the system may make this determination based on various types of data associated with the point or segment. In various examples, the system may perform operation 212 on those points and/or segments that have also met one or more other criteria, such as being associated with a drivable region as determined at operation 204, being associated with a solid object as determined at operation 206, being associated with a sufficiently dynamic object as determined at operation 208, and/or being associated with a sufficiently small object as determined at operation 210. In various other examples, the system may perform operation 210 on those points and/or segments that have also met one or more criteria. In various other examples, the system may perform operation 212 on points and/or segments that have not been determined to meet one or more other criteria.

If the point or segment is associated with an object within an occluded region, at operation 216 the system may not label the unlabeled lidar point or segment and/or may defer labeling the unlabeled lidar point or segment to one or more other classifiers. Alternatively, at operation 216 the system may associate the unlabeled lidar point or segment with an indication that the unlabeled lidar point or segment is unlabeled and/or has not been labeled as being associated with a small, dynamic, non-impeding object. If the point or segment is determined to be associated with an unoccluded object (e.g., an object not within an occluded region), the system may perform one or more determinations using the various criteria associated with small, dynamic, non-impeding objects. Alternatively or additionally, if other criteria associated with small, dynamic, non-impeding objects have been met and/or if there are no other criteria associated with small, dynamic, non-impeding objects to be met, at operation 214 the system may label the unlabeled lidar point or segment as being associated with a small, dynamic, non-impeding object (e.g., with a "bird" label).

In various examples, one or more operations of process 200 may be omitted. For example, the system may determine that a segment is associated with an object that is sufficiently small, dynamic, on a drivable region, and unoccluded. The system may determine to label this object as a small, dynamic, non-impeding object without performing a solidity determination operation (e.g. operation 206). Similarly, other operations may be omitted. Moreover, other operations may be included in process 200 that may not be explicitly described herein. All such implementations are contemplated as within the scope of the instant disclosure.

FIG. 3 is a block diagram of an example lidar perception and small, dynamic, non-impeding object tracking system 300 according to various examples. The system 300 may be implemented at a vehicle (e.g., an autonomous vehicle) by a vehicle computing system and may include one or more of the components and systems illustrated in FIGS. 3-5 and described below. For example, one or more components and systems can include those associated with one or more of the one or more sensor systems 404 and 506, one or more of the perception components 406 and 522, and/or one or more of the planning components 418 and 528. In some examples, the one or more components of the system 300 may also, or instead, be implemented at a remote system in communication with a vehicle, such as the perception component 544 and/or planning component 550 of the computing device(s) 538 illustrated in FIG. 5. In still other examples, one or more operations of the system 300 may be implemented as a combination of a components at a remote system and a vehicle computing system. However, the system 300 is not limited to being performed by such components and systems, and the components and systems of FIGS. 4 and 5 are not limited to implementing the system 300.

Lidar sensor data 302 may be generated, determined, received, and/or provided to the system 300. In various examples, a vehicle configured with one or more lidar sensors may be operate such sensors to emit lidar pulses into an environment and detect lidar return pulses reflected from surfaces in the environment. Such sensors may then collect and store the return lidar pulses and/or associated data. In examples such sensors may perform processing and/or generation of data based on the detected return pulses to generate lidar sensor data 302.

For example, individual lidar sensors may include one or more processing components configured to execute a machine-learned model (e.g., convolutional neural network (CNN) model trained as described herein) to detect and label one or more lidar points. Such sensors may determine three-dimensional properties of individual detected lidar return pulses (e.g., lidar points) such as depth, height, and intensity and use such properties to generate one or more (e.g., semantic) labels for such lidar points. This labeling may include labeling one or more such points as "impeding," "non-impeding," "small, dynamic, non-impeding," or the like. Such sensors may also, or instead, determine not to label one or more lidar points, instead leaving such points unlabeled or otherwise ignoring such points. Such label data determined by one or more lidar sensors may be represented in the lidar sensor data 302. In various embodiments, one or more downstream components may determine and/or apply one or more labels to unlabeled lidar points. One or more downstream components may also, or instead, change or otherwise alter one or more labels applied to one or more lidar points by a lidar system and/or represented in the lidar sensor data 302.

In various embodiments, one or more lidar sensors may voxelize lidar point data to generate a three-dimensional representation of the lidar points in an environment that may be represented in the lidar sensor data 302. For example, the vehicle computing system may determine the lidar points determined based on return lidar pulses detected in the environment, determine portions of the environment within which the individual lidar points are located, and determine voxels for those portions of the environment. The one or more lidar sensors may aggregate data associated with the individual lidar points in individual voxels to determine voxel data for the individual voxels. If there are multiple types of lidar point data available for an individual lidar point or combination of lidar points (e.g., lidar intensity, static probability, occlusion, size, location, return distance, return distance difference, propagation time difference, etc.), the vehicle computing system may determine an aggregate value for individual types of lidar point data for individual voxels. This aggregation may be an averaging function that averages a particular type of lidar point data within a voxel or some other function. The function(s) use to determine aggregated voxel data may vary based on the data being aggregated. The one or more lidar sensors may perform labeling operations for individual lidar points based on data associated with such individual points and/or for individual voxels based on aggregated data associated with such individual voxels.

The lidar sensor data 302 representing lidar data from one or more lidar sensor configured at a vehicle (e.g., from all lidar sensors configured at the vehicle) may be received at or otherwise obtained by a lidar perception system 304. The lidar perception system 304 may include a top-down segmentation component 306 that may receive the lidar sensor data 302. The top-down segmentation component 306 may include a CNN 308 that may be configured to execute a machine-learned model that uses the lidar sensor data 302 (e.g., the voxelized lidar data, three-dimensional lidar point data, and/or any other lidar point data and/or associated data determined by one or more lidar sensors) to generate a two-dimensional data representing the environment in which the vehicle may be traveling. For example, this two-dimensional data may represent a top-down two-dimensional grid representation of the environment and may include any representations and/or aggregations of the lidar sensor data.

The top-down segmentation component 306 may use the two-dimensional data determined by the CNN 308 to determine lidar segment data based on lidar point data represented in the two-dimensional data. The determined lidar segment data may represent one or more lidar segments in the environment. In various embodiments, the top-down segmentation component 306 may represent such lidar segments as connected cells in a top-down two-dimensional grid representation of the environment determined by the CNN 308. The lidar segment data determined by the top-down segmentation component 306 may also, or instead, take other forms.

The top-down segmentation component 306 may determine labels for the one or more lidar segments represented in the determined lidar segment data. For example, the top-down segmentation component 306 may associate the labels that were associated with individual lidar points in a particular segment with that segment. Alternatively or additionally, the top-down segmentation component 306 may determine labels for one or more lidar segments (e.g., even if already labeled in based on the lidar sensor data) based on associated segment data and/or lidar point data associated with the lidar points associated with such segments. In various examples, the top-down segmentation component 306 may not determine labels for all segments in the determined lidar segment data, leaving one or more segments unlabeled in the lidar segment data unlabeled. In various other examples, the top-down segmentation component 306 may not determine labels for any segments in the determined lidar segment data, leaving all segments represented in the lidar segment data unlabeled. In such examples, unlabeled lidar segments may be labeled by one or more downstream components, for example, as described herein.

The top-down segmentation component 306 may provide determined lidar segment data to the lidar segment classifier component 310. In various embodiments, the lidar segment classifier component 310 may include one or more segment classifiers 312, which may include one or more auto-labeling classifiers that assign impeding or non-impeding labels to unlabeled segments as described herein. For example, one or more auto-labeling classifiers may determine and assign labels associated with small, dynamic, non-impeding objects as described herein. Such auto-labeling classifiers may execute a machine-learned model trained according to the disclosed examples. The one or more segment classifiers 312 may also, or instead, include classifiers that assign or otherwise determine labels for other types of segments and/or objects, including segments and/or objects that have been previously labeled. Alternatively, the lidar segment classifier component 310 and/or one or more of the segment classifiers 312 may be dedicated to classifying unlabeled segments.

In various examples, an auto-labeling classifier configured among the segment classifier(s) 312 may determine one or more unlabeled segments in the lidar segment data received from the top-down segmentation component 306. The auto-labeling classifier may determine whether to label such segments as "small, dynamic, non-impeding," as described herein. In various examples, the auto-labeling classifier may not label a segment, instead determining to leave the segment unlabeled based on the segment data (e.g., based on determining that sufficient small, dynamic, non-impeding object criteria has not been met). Where a segment remains unlabeled, in various examples one or more other classifiers (e.g., from among the segment classifier(s) 312) may determine a label for such a segment.

The lidar segment classifier component 310 may further include one or more consistency components 314. The consistency component(s) 314 may determine whether a label associated with a lidar segment (e.g., by the segment classifier(s) 312) is appropriate and/or accurate, for example, using one or more consistency and/or probability algorithms, lidar segment data, and/or other available data. If the consistency component(s) 314 determine that a label is inaccurate, the consistency component(s) 314 may adjust the label and/or replace the label with a more accurate label. In some examples, the consistency component(s) 314 may also be a final check to ensure that individual lidar segments are labeled and may determine and assign a label to any such segments that remain unlabeled. Alternatively, the segment classifier(s) 312 may be configured to determine and assign a label to the individual lidar segments represented in the lidar segment data received from the top-down segmentation component 306 and the consistency component(s) 314 may verify and adjust such labels as-needed.

The lidar segment classifier component 310 may determine impeding and other point/segment data 316 and small, dynamic, non-impeding segment data 318. In various examples, the impeding and other point/segment data 316 may include data associated with any lidar segment that is labeled with any label other than "small, dynamic, non-impeding" (e.g., pedestrian, vehicle, bicycle, impeding, barrel, etc.). The small, dynamic, non-impeding segment data 318 may include data associated with any lidar segment that is labeled as "small, dynamic, non-impeding." As noted herein, such segments may be associated with small, dynamic, non-impeding solid objects that do not impede the motion of vehicle in the environment (e.g., birds, bats, large insects, plastic bags, paper debris, tumbleweed, leaves, etc.).

The impeding and other point/segment data 316 and small, dynamic, non-impeding segment data 318 may be provided to a sensor fusion and tracking system 320. The sensor fusion and tracking system 320 may use lidar point and/or segment data and other types of sensor data (e.g., data from camera sensors, radar sensors, sonar sensors, ultrasonic sensors, inertial sensors, GPS, etc.) to determine tracking data for objects in an environment and/or the vehicle itself. In various examples, the sensor fusion and tracking system 320 may include a small, dynamic, non-impeding object tracking system 322 that may use the small, dynamic, non-impeding segment data 318, in examples in conjunction with other sensor data, to determine tracking data such as small, dynamic, non-impeding object tracks 324, for one or more small, dynamic, non-impeding objects. A vehicle computing system may use the small, dynamic, non-impeding object tracks 324 to control a vehicle. For example, a vehicle computing system may determine to slow down the vehicle when approaching a small, dynamic, non-impeding object represented in the small, dynamic, non-impeding object tracks 324 (e.g., rather than stop or drive around the object as it may if the object was an impeding object).

FIG. 4A is a perspective view of an example environment 400 in which a vehicle 402 may be traveling. The vehicle 402 may be configured with a sensor system 404 that may include a lidar perception system 406. The lidar perception system 406 may include emitters/sensors 408 that may be configured to emit one or more lidar pulses into the environment 400 and detect one or more return lidar pulses resulting from reflections of the lidar pulses emitted into the environment 400. The vehicle 402 may further be configured with a vehicle computing system 410 that may include one or more processors 412, a memory 414, a tracking component 416, and a planning component 418, any one or more of which may be used to perform one or more of the operations described herein.

The environment 400 may include a drivable region 420, a non-drivable region 422, and various objects that may have surfaces that may have reflected lidar pulses emitted by the emitters/sensors 408, resulting in the determination (e.g., by a top-down segmentation component of the lidar perception system 406) of various types of lidar points and/or segments within the environment 400. Among such segments may be segments classified by sensors and/or the sensor system(s) 404 as associated with particular types of objects in the environment 400, such as vehicle 424. Also among such segments may be unclassified lidar segments such as unclassified lidar segments 426, 428, and 430. Other segments in environment (not shown) may be associated with other types of objects and may have been classified accordingly.

The lidar perception system 406 may include one or more machine-learned models that may have been trained according to the examples disclosed herein. The lidar perception system 406 may execute the machine-learned model(s) to perform classification and labeling operations as described herein to determine one or more classifications for the unclassified lidar segments 426, 428, and 430. The label data and associated lidar segment data for unclassified lidar segments 426, 428, and 430 may be provided to the tracking component 416 for use in determining tracks for the objects associated with the unclassified lidar segments 426, 428, and 430.

For example and referring now to FIG. 4B providing another perspective view of the example environment 400, the lidar perception system 406 may classify the unclassified lidar segment 426 that is not within the drivable region 422 (e.g., is associated with a non-drivable region) as a particular type of other object 436 (e.g., other than a small, dynamic, non-impeding object). The lidar perception system 406 may further classify the unclassified lidar segment 428 that is in the drivable region 420 as being associated with a small, dynamic, non-impeding lidar segment 432 (e.g., with a "bird" label). The lidar perception system 406 may further classify the unclassified lidar segment 430 that is in the drivable region 420 and associated with an object (e.g., a pedestrian) that is obscured by the vehicle 424 as a particular type of other object 434 (e.g., an object other than a small, dynamic, non-impeding object).

The tracking component 416 may use this data, in some examples in conjunction with other data, to determine the objects associated with such (now) classified lidar segment and the tracks associated with such objects. Referring again to FIG. 4B providing another perspective view of the example environment 400, the vehicle computing system 410, and in particular examples the tracking component 416, may determine that the object 436 associated with the formerly unclassified lidar segment 426 is an object that is not in the drivable region 420. Similarly, the tracking component 416 may determine that the other object 434 associated with the formerly unclassified lidar segment 430 is an impeding object that is in the drivable region and may determine a track (e.g., predicted path of travel within the environment 400) for the impeding object 434. The tracking component 416 may also, or instead, determine that the "bird" object 432 associated with the formerly unclassified lidar segment 428 is a small, dynamic, non-impeding object that is in the drivable region and may determine a track for the small, dynamic, non-impeding object 432.

The vehicle computing system 410 may use the planning component 418 to determine a trajectory for the vehicle 402 based on the objects determined using the lidar segment data determined the lidar perception system 406. For example, the planning component may generate a trajectory that slow the vehicle while encountering the small, dynamic, non-impeding object 432 and that steers the vehicle around the object 434. Because the object 436 is not within the drivable region 420, the vehicle computing system 410 may not use data associated with the object 436 to generate a track for that object and/or plan a trajectory for the vehicle 402. Alternatively, the vehicle computing system 410 may use data associated with the object 436 to generate a track for that object and/or generate a vehicle trajectory, for example, updating the trajectory if the predicted track for the object 436 indicates that the object is going to enter into the drivable region 420.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522 that may include a top-down segmentation component 524 and/or a small, dynamic, non-impeding object classification component 526 that may be configured to perform one or more of the object auto-labeling and machine-learned model training operations described herein, a planning component 528, one or more system controllers 530, one or more maps 532, and a prediction component 534. Though depicted in FIG. 5 as residing in memory 518 for illustrative purposes, it is contemplated that any one or more of the localization component 520, the perception component 522, the top-down segmentation component 524, the small, dynamic, non-impeding object classification component 526, the planning component 528, the one or more system controllers 530, the one or more maps 532, and the prediction component 534 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification, in addition to, or instead of, object auto-labeling and machine-learned model training operations as described herein. For example, the perception component may include functionality to analyze lidar return pulse intensity data to determine whether to label a lidar segment as impeding, generally non-impeding, and/or small, dynamic, and non-impeding, as described herein. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, small, dynamic, non-impeding object, unknown). In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as the voxel data structures generated by the described voxelization process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation (e.g., a small, dynamic, non-impeding object designation), intensity, etc. Such entity characteristics may be represented in a data structure as described herein (e.g., a voxel data structure generated as output of one or more voxelization operations, a two-dimensional grid of cells containing data, etc.). Characteristics associated with the environment can include, but are not limited to, a presence of another entity in the environment, a state of another entity in the environment, a time of day, a day of a week, a season, a weather condition, an indication of darkness/light, etc. In some examples, the perception component 522 can provide processed return pulse data as described herein.

In general, the planning component 528 can determine a path for the vehicle 502 to follow to traverse through an environment. In some examples, the planning component 528 can determine various routes and trajectories and various levels of detail. For example, the planning component 528 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, and/or the planning component 528 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year). Storing multiple maps 532 can have similar memory requirements but increase the speed at which data in a map can be accessed.

In general, the prediction component 534 can generate predicted trajectories of objects in an environment. For example, the prediction component 534 can generate one or more predicted trajectories for vehicles, pedestrians, animals, and the like within a threshold distance from the vehicle 502. In some instances, the prediction component 534 can measure a trace of an object and generate a trajectory for the object based on observed and predicted behavior. In some examples, the prediction component 534 can use data and/or data structures based on return pulses as described herein to generate one or more predicted trajectories for various mobile objects in an environment. In some examples, the prediction component 534 may be a sub-component of perception component 522.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may one or more convolution/deconvolution layers. Such a CNN may be a component of and/or interact with the top-down segmentation component 524 and/or the small, dynamic, non-impeding object classification component 526.

An example neural network is an algorithm that passes input data through a series of connected layers to produce an output. Individual layers in a neural network can also comprise another neural network or can comprise any number of layers, and such individual layers may convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time of flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 536, to the one or more computing device(s) 538 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable region presence, and/or other data as described herein.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable wireless-based communication (e.g., WI-FI™) such as via frequencies defined by the IEEE 802.11 standards, short range wireless frequencies such as BLUETOOTH™, cellular communication (e.g., 2G, 3G, 4G, 4G LTE, 5G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., data representing return pulses) to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a planning component 550 and/or a perception component 544 that may include a top-down segmentation component 546 and/or a small, dynamic, non-impeding object classification component 548 that may be configured to perform one or more of the object auto-labeling and machine-learned model training operations described herein. In some instances, the perception component 544 can substantially correspond to the perception component 522 and can include substantially similar functionality. In some instances, the planning component 550 can substantially correspond to the planning component 528 and can include substantially similar functionality.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the techniques and operations described herein and the functions attributed to the various disclosed systems. In various implementations, the memory 518 and 542 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

Example Clauses

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving lidar data associated with an environment, the lidar data comprising one or more unlabeled lidar segments; determining, based at least in part on the lidar data, a lidar segment of the one or more unlabeled lidar segments that is associated with a drivable region of the environment; determining, based at least in part on the lidar data, that the lidar segment is associated with a dynamic object; determining, based at least in part on the lidar data, that the dynamic object is of a size less than an object size threshold; determining, based at least in part on the lidar data, that the dynamic object is in an unoccluded region for one or more lidar sensors associated with the lidar data; assigning a label to the lidar segment based at least in part on determining that the lidar segment is associated with the dynamic object of the size less than the object size threshold and in an unoccluded region; and training a machine-learned (ML) perception model based at least in part on the label and the lidar segment.

B: The system of paragraph A, wherein the operations further comprise: determining that a second lidar segment of the one or more unlabeled lidar segments associated with the drivable region of the environment is associated with an object that is at least one of nondynamic, a second size greater than or equal to the object size threshold, or in an occluded region for the one or more lidar sensors associated with the lidar data; and assigning a second label or no label to the second lidar segment based at least in part on determining that the object is at least one of nondynamic, the second size greater than or equal to the object size threshold, or in the occluded region.

C: The system of paragraph A or B, wherein the operations further comprise: determining an intensity value for the lidar segment based at least in part on the lidar data; and determining that the dynamic object is solid based at least in part on the intensity value; assigning the label to the lidar segment is further based at least in part on determining that the dynamic object is solid.

D: The system of any of paragraphs A-C, wherein determining that the lidar segment is associated with the dynamic object comprises: determining a static probability value for the lidar segment based at least in part on the lidar data; and determining that the lidar segment is associated with the dynamic object based at least in part on determining that the static probability value exceeds a static probability threshold value.

E: The system of any of paragraphs A-D, wherein the operations further comprise transmitting the ML model to a vehicle configured to traverse a second environment based at least in part on output received from the ML model.

F: A method comprising: receiving lidar data associated with an environment, the lidar data comprising an unlabeled portion; determining, by one or more processors, that the unlabeled portion is associated with a drivable region of the environment; determining, by the one or more processors, a plurality of object characteristics for an object associated with the unlabeled portion based at least in part on the lidar data; determining that individual characteristics of the plurality of object characteristics correspond to individual criteria of a plurality of small, dynamic, non-impeding object criteria; and assigning a label to the unlabeled portion based at least in part on determining that the individual characteristics of the plurality of object characteristics correspond to the individual criteria of the plurality of small, dynamic, non-impeding object criteria.

G: The method of paragraph F, wherein: the plurality of small, dynamic, non-impeding object criteria comprises an occlusion criterion; and determining that the individual characteristics of the plurality of object characteristics correspond to the individual criteria of the plurality of small, dynamic, non-impeding object criteria comprises determining that the object is in an unoccluded region for one or more lidar emitters associated with the lidar data based at least in part on the occlusion criterion.

H: The method of paragraph F or G, wherein: the plurality of small, dynamic, non-impeding object criteria comprises an object size threshold; and determining that the individual characteristics of the plurality of object characteristics correspond to the individual criteria of the plurality of small, dynamic, non-impeding object criteria comprises: determining a size of the object based at least in part on the lidar data; and determining that the size of the object is less than the object size threshold.

I: The method of any of paragraphs F-H, wherein determining the lidar data comprises: receiving sensor data from a plurality of sensors; and determining a plurality of two-dimensional portions associated with the lidar data comprising the unlabeled portion based at least in part on the sensor data.

J: The method of any of paragraphs F-I, further comprising: determining that a second unlabeled portion associated with the lidar data is associated with the drivable region of the environment; determining a second plurality of object characteristics for a second object associated with the second unlabeled portion based at least in part on the lidar data; determining that at least one characteristic of the second plurality of object characteristics does not correspond to at least one criterion of the plurality of small, dynamic, non-impeding object criteria; and assigning a second label or no label to the second unlabeled portion based at least in part on determining that the at least one characteristic of the second plurality of object characteristics does not correspond to the at least one criterion of the plurality of small, dynamic, non-impeding object criteria.

K: The method of any of paragraphs F-J, further comprising: determining that a second unlabeled portion associated with the lidar data is associated with a non-drivable region of the environment; and assigning a second label or no label to the second unlabeled portion based at least in part on determining that the second unlabeled portion is associated with the non-drivable region of the environment.

L: The method of any of paragraphs F-K, wherein the plurality of small, dynamic, non-impeding object criteria comprises an intensity threshold; and determining that the individual characteristics of the plurality of object characteristics correspond to the individual criteria of the plurality of small, dynamic, non-impeding object criteria comprises: determining an intensity of the unlabeled portion based at least in part on the lidar data; and determining that the object is solid based at least in part on the intensity and the intensity threshold.

M: The method of any of paragraphs F-L, further comprising training a machine-learned (ML) model to detect a small, dynamic, non-impeding object based at least in part on the label and the unlabeled portion.

N: The method of any of paragraphs F-M, wherein the lidar data further comprises a labeled portion.

O: One or more non-transitory computer-readable media storing instructions that, when executed by one or more processors, perform operations comprising: determining lidar data associated with an environment, the lidar data comprising an unlabeled lidar segment; determining a plurality of object characteristics for an object associated with the unlabeled lidar segment based at least in part on the lidar data; determining that individual characteristics of the plurality of object characteristics correspond to individual criteria of a plurality of small, dynamic, non-impeding object criteria; determining to assign a label to the unlabeled lidar segment based at least in part on determining that the individual characteristics of the plurality of object characteristics correspond to the individual criteria of the plurality of small, dynamic, non-impeding object criteria; and training a machine-learned (ML) model to detect a small, dynamic, non-impeding object based at least in part on the label and the unlabeled lidar segment.

P: The one or more non-transitory computer-readable media of paragraph O, wherein the operations comprise: determining a second plurality of object characteristics for a second object associated with a second unlabeled lidar segment based at least in part on the lidar data; determining to assign a second label or no label to the second unlabeled lidar segment based at least in part on determining that individual characteristics of the second plurality of object characteristics do not correspond to the individual criteria of the plurality of small, dynamic, non-impeding object criteria.

Q: The one or more non-transitory computer-readable media of paragraph O or P, wherein: the plurality of small, dynamic, non-impeding object criteria comprises a drivable region criterion; determining the plurality of object characteristics for the object comprises determining that the object is in a drivable region of the environment based at least in part on the lidar data; and determining to assign the label to the unlabeled lidar segment is further based at least in part on determining that the object is in the drivable region.

R: The one or more non-transitory computer-readable media of any of paragraphs O-Q, wherein the operations further comprise training a machine-learned (ML) model to detect a small, dynamic, non-impeding object based at least in part on the unlabeled lidar segment and the label.

S: The one or more non-transitory computer-readable media of any of paragraphs O-R, wherein the operations further comprise transmitting the ML model to a vehicle configured to control the vehicle based at least in part on output received from the ML model.

T: The one or more non-transitory computer-readable media of paragraph S, wherein: the output received from the ML model comprises an indication of the small, dynamic, non-impeding object; and the vehicle is configured to slow the vehicle based at least on part on the indication of the small, dynamic, non-impeding object.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
  receiving lidar data associated with an environment, the lidar data comprising one or more unlabeled lidar segments;
  determining, based at least in part on the lidar data, a lidar segment of the one or more unlabeled lidar segments that is associated with a drivable region of the environment;
  determining, based at least in part on the lidar data, that the lidar segment is associated with a dynamic object;
  determining, based at least in part on the lidar data, that the dynamic object is of a size less than an object size threshold;
  determining, based at least in part on the lidar data, that the dynamic object is in an unoccluded region for one or more lidar sensors associated with the lidar data;
  assigning a label to the lidar segment based at least in part on determining that the lidar segment is associated with the dynamic object of the size less than the object size threshold and in the unoccluded region;
  training a machine-learned (ML) perception model based at least in part on the label and the lidar segment; and
  transmitting the ML perception model to a vehicle configured to control the vehicle based at least in part on output comprising an indication of the dynamic object of the size less than the object size threshold and in the unoccluded region received from the perception ML model, wherein the vehicle is configured to control movement of the vehicle based at least in part on the indication.

2. The system of claim 1, wherein the operations further comprise:
  determining that a second lidar segment of the one or more unlabeled lidar segments associated with the drivable region of the environment is associated with an object that is at least one of nondynamic, a second size greater than or equal to the object size threshold, or in an occluded region for the one or more lidar sensors associated with the lidar data; and
  assigning a second label or no label to the second lidar segment based at least in part on determining that the object is at least one of nondynamic, the second size greater than or equal to the object size threshold, or in the occluded region.

3. The system of claim 1, wherein:
the operations further comprise:
  determining an intensity value for the lidar segment based at least in part on the lidar data; and
  determining that the dynamic object is solid based at least in part on the intensity value; and
  assigning the label to the lidar segment is further based at least in part on determining that the dynamic object is solid.

4. The system of claim 1, wherein determining that the lidar segment is associated with the dynamic object comprises:
  determining a static probability value for the lidar segment based at least in part on the lidar data; and
  determining that the lidar segment is associated with the dynamic object based at least in part on determining that the static probability value exceeds a static probability threshold value.

5. The system of claim 1, wherein assigning the label to the lidar segment is further based at least in part on a speed associated with the dynamic object.

6. A method comprising:
receiving lidar data associated with an environment, the lidar data comprising an unlabeled portion;
determining, by one or more processors, that the unlabeled portion is associated with a drivable region of the environment;
determining, by the one or more processors, a plurality of object characteristics for an object associated with the unlabeled portion based at least in part on the lidar data;
determining that individual characteristics of the plurality of object characteristics correspond to individual criteria of a plurality of small, dynamic, non-impeding object criteria;
assigning a label to the unlabeled portion based at least in part on determining that the individual characteristics of the plurality of object characteristics correspond to the individual criteria of the plurality of small, dynamic, non-impeding object criteria;
training a machine-learned (ML) model to detect a small, dynamic, non-impeding object based at least in part on the label and the unlabeled portion; and
transmitting the ML model to a vehicle configured to control the vehicle based at least in part on output comprising an indication of the small, dynamic, non-impeding object received from the ML model, wherein the vehicle is configured to control movement of the vehicle based at least in part on the indication of the small, dynamic, non-impeding object.

7. The method of claim 6, wherein:
the plurality of small, dynamic, non-impeding object criteria comprises an occlusion criterion; and
determining that the individual characteristics of the plurality of object characteristics correspond to the individual criteria of the plurality of small, dynamic, non-impeding object criteria comprises determining that the object is in an unoccluded region for one or more lidar emitters associated with the lidar data based at least in part on the occlusion criterion.

8. The method of claim 6, wherein:
the plurality of small, dynamic, non-impeding object criteria comprises an object size threshold; and
determining that the individual characteristics of the plurality of object characteristics correspond to the individual criteria of the plurality of small, dynamic, non-impeding object criteria comprises:

determining a size of the object based at least in part on the lidar data; and determining that the size of the object is less than the object size threshold.

9. The method of claim 6, wherein determining the lidar data comprises:

receiving sensor data from a plurality of sensors; and determining a plurality of two-dimensional portions associated with the lidar data comprising the unlabeled portion based at least in part on the sensor data.

10. The method of claim 6, further comprising:

determining that a second unlabeled portion associated with the lidar data is associated with the drivable region of the environment;

determining a second plurality of object characteristics for a second object associated with the second unlabeled portion based at least in part on the lidar data;

determining that at least one characteristic of the second plurality of object characteristics does not correspond to at least one criterion of the plurality of small, dynamic, non-impeding object criteria; and assigning a second label or no label to the second unlabeled portion based at least in part on determining that the at least one characteristic of the second plurality of object characteristics does not correspond to the at least one criterion of the plurality of small, dynamic, non-impeding object criteria.

11. The method of claim 6, further comprising:

determining that a second unlabeled portion associated with the lidar data is associated with a non-drivable region of the environment; and assigning a second label or no label to the second unlabeled portion based at least in part on determining that the second unlabeled portion is associated with the non-drivable region of the environment.

12. The method of claim 6, wherein:

the plurality of small, dynamic, non-impeding object criteria comprises an intensity threshold; and determining that the individual characteristics of the plurality of object characteristics correspond to the individual criteria of the plurality of small, dynamic, non-impeding object criteria comprises:

determining an intensity of the unlabeled portion based at least in part on the lidar data; and determining that the object is solid based at least in part on the intensity and the intensity threshold.

13. The method of claim 6, wherein the vehicle is configured to control the movement of the vehicle by one or more of:

slowing the vehicle, stopping the vehicle, or controlling the vehicle around the small, dynamic, non-impeding object.

14. The method of claim 6, wherein the lidar data further comprises a labeled portion.

15. One or more non-transitory computer-readable media storing instructions that, when executed by one or more processors, perform operations comprising:

determining lidar data associated with an environment, the lidar data comprising an unlabeled lidar segment;

determining a plurality of object characteristics for an object associated with the unlabeled lidar segment based at least in part on the lidar data;

determining that individual characteristics of the plurality of object characteristics correspond to individual criteria of a plurality of small, dynamic, non-impeding object criteria;

determining to assign a label to the unlabeled lidar segment based at least in part on determining that the individual characteristics of the plurality of object characteristics correspond to the individual criteria of the plurality of small, dynamic, non-impeding object criteria;

training a machine-learned (ML) model to detect a small, dynamic, non-impeding object based at least in part on the label and the unlabeled lidar segment; and transmitting the ML model to a vehicle configured to control the vehicle based at least in part on output comprising an indication of the small, dynamic, non-impeding object received from the ML model, wherein the vehicle is configured to control movement of the vehicle based at least in part on the indication of the small, dynamic, non-impeding object.

16. The one or more non-transitory computer-readable media of claim 15, wherein the operations comprise:

determining a second plurality of object characteristics for a second object associated with a second unlabeled lidar segment based at least in part on the lidar data; and determining to assign a second label or no label to the second unlabeled lidar segment based at least in part on determining that individual characteristics of the second plurality of object characteristics do not correspond to the individual criteria of the plurality of small, dynamic, non-impeding object criteria.

17. The one or more non-transitory computer-readable media of claim 15, wherein:

the plurality of small, dynamic, non-impeding object criteria comprises a drivable region criterion;

determining the plurality of object characteristics for the object comprises determining that the object is in a drivable region of the environment based at least in part on the lidar data; and determining to assign the label to the unlabeled lidar segment is further based at least in part on determining that the object is in the drivable region.

18. The one or more non-transitory computer-readable media of claim 15, wherein determining that the individual characteristics of the plurality of object characteristics correspond to the individual criteria of the plurality of small, dynamic, non-impeding object criteria comprises determining that the object is in an unoccluded region.

19. The one or more non-transitory computer-readable media of claim 18, wherein determining that the individual characteristics of the plurality of object characteristics correspond to the individual criteria of the plurality of small, dynamic, non-impeding object criteria comprises determining that a size of the object is less than an object size threshold.

20. The one or more non-transitory computer-readable media of claim 19, wherein the vehicle is configured to control the movement of the vehicle by one or more of:

slowing the vehicle, stopping the vehicle, or controlling the vehicle around the small, dynamic, non-impeding object.

* * * * *